United States Patent
Kawai

(10) Patent No.: US 11,601,570 B2
(45) Date of Patent: Mar. 7, 2023

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Yoshinori Kawai, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/665,762

(22) Filed: Feb. 7, 2022

(65) Prior Publication Data

US 2022/0256057 A1 Aug. 11, 2022

(30) Foreign Application Priority Data

Feb. 9, 2021 (JP) .............................. JP2021-018965

(51) Int. Cl.
*H04N 1/60* (2006.01)

(52) U.S. Cl.
CPC ......... *H04N 1/6019* (2013.01); *H04N 1/6008* (2013.01)

(58) Field of Classification Search
CPC ........................... H04N 1/6019; H04N 1/6008
See application file for complete search history.

(56) References Cited

U.S. PATENT DOCUMENTS

| | | | | |
|---|---|---|---|---|
| 6,292,195 | B1 * | 9/2001 | Shimizu | H04N 1/6058 345/604 |
| 6,697,520 | B1 * | 2/2004 | Hemingway | H04N 1/6019 358/525 |
| 2003/0218656 | A1 * | 11/2003 | Yamazaki | B41J 2/17566 347/43 |
| 2008/0018962 | A1 * | 1/2008 | Kawai | H04N 1/6019 358/522 |
| 2009/0180150 | A1 * | 7/2009 | Borg | H04N 1/6052 358/3.01 |
| 2012/0113178 | A1 * | 5/2012 | Yamashita | H04N 1/6038 347/15 |
| 2012/0113476 | A1 * | 5/2012 | Yoshida | H04N 1/6027 358/2.1 |
| 2015/0015914 | A1 * | 1/2015 | Kakutani | H04N 1/4057 358/3.01 |
| 2016/0044210 | A1 * | 2/2016 | Imafuku | H04N 1/6019 382/164 |

(Continued)

FOREIGN PATENT DOCUMENTS

| | | | | |
|---|---|---|---|---|
| CN | 110490981 A | * | 11/2019 | .............. G01J 3/462 |
| JP | 6322557 B2 | * | 5/2018 | |
| JP | 6322557 B2 | | 5/2018 | |

*Primary Examiner* — Ted W Barnes
(74) *Attorney, Agent, or Firm* — Venable LLP

(57) ABSTRACT

In a predetermined look-up table, in which each of a plurality of grid points that are defined by dividing each axis of RGB color coordinates is associated with a combination of density values respectively corresponding to a plurality of inks to be used by a printing apparatus, the plurality of grid points include a plurality of first grid points, at which a density value of a predetermined ink among the plurality of inks does not correspond to 0, and a second grid point, at which the density value of the predetermined ink corresponds to 0, and the plurality of first grid points do not exist at points adjacent to each other in the plurality of grid points.

14 Claims, 20 Drawing Sheets

(56) References Cited

U.S. PATENT DOCUMENTS

2017/0324885 A1* 11/2017 Ochiai ............... G06K 15/1878
2019/0114518 A1* 4/2019 Matsuzaki ......... G06K 15/1878
2020/0137265 A1* 4/2020 Nakashio ................. H04N 1/62

* cited by examiner

| FLUORESCENT SPOT COLOR LIST | SPOT COLOR DEFINITION (R, G, B) | OUTPUT INK SEPARATION (C, M, Y, K, FP) |
|---|---|---|
| FLUORESCENT SPOT COLOR 1 | (255,0,255) | (0,0,0,0,100%) |
| FLUORESCENT SPOT COLOR 2 | (255,51,255) | (0,0,0,0,80%) |
| FLUORESCENT SPOT COLOR 3 | (255,102,255) | (0,0,0,0,60%) |

FIG.10

| NORMAL COLOR LIST | NORMAL COLOR DEFINITION (R, G, B) | OUTPUT INK SEPARATION (C, M, Y, K, FP) |
|---|---|---|
| NORMAL COLOR 1 | (204,51,204) | (20,80,20,0,0%) |
| NORMAL COLOR 2 | (204,154,204) | (40,60,40,10,0%) |
| ⋮ | ⋮ | ⋮ |

| COLOR INPUT (R, G, B) | OUTPUT (C, M, Y, K, FP) |
|---|---|
| (0,0,0) | (0,0,0,100,0%) |
| (0,0,17) | (10,10,0,80,0%) |
| (0,0,34) | (20,20,0,60,0%) |
| ⋮ | ⋮ |
| (255,255,238) | (0,0,10,0,0%) |
| (255,255,255) | (0,0,0,0,0%) |

| COLOR INPUT (R, G, B) | OUTPUT (C, M, Y, K, FP) |
|---|---|
| (0,0,0) | (0,0,0,100,0%) |
| (0,0,17) | (10,10,0,80,0%) |
| (0,0,34) | (20,20,0,60,0%) |
| ⋮ | ⋮ |
| (255,0,255) | (0,0,0,0,100%) |
| ⋮ | ⋮ |
| (255,51,255) | (0,0,0,0,80%) |
| ⋮ | ⋮ |
| (255,102,255) | (0,0,0,0,60%) |
| ⋮ | ⋮ |
| (255,255,238) | (0,0,10,0,0%) |
| (255,255,255) | (0,0,0,0,0%) |

FIG.15

| FLUORESCENT SPOT COLOR LIST | FLUORESCENT SPOT COLOR DEFINITION (R, G, B) | OUTPUT INK SEPARATION (C, M, Y, K, FP) |
|---|---|---|
| FLUORESCENT SPOT COLOR 1 | (255,0,255) | (0,0,0,0,100%) |
| FLUORESCENT SPOT COLOR 2 | (255,51,255) | (0,0,0,0,80%) |
| FLUORESCENT SPOT COLOR 3 | (255,102,255) | (0,0,0,0,60%) |
| FLUORESCENT SPOT COLOR 4 | (255,0,204) | (0,0,20,0,100%) |
| ⋮ | ⋮ | ⋮ |
| FLUORESCENT SPOT COLOR 11 | (255,102,0) | (0,0,100,0,60%) |
| FLUORESCENT SPOT COLOR 12 | (255,153,0) | (0,0,100,0,40%) |

FIG.18

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus, an information processing method, and a storage medium for performing printing using a special ink such as a fluorescent ink.

Description of the Related Art

A printing apparatus that performs printing on a print medium by use of a fluorescent ink, metallic ink, etc., is known. In the present specification, it is assumed that the fluorescent ink is an ink using a color material having fluorescent characteristics and the metallic ink is an ink containing metal particles. Further, the fluorescent ink and metallic ink are also referred to as special inks. In a case of performing printing with use of such a special ink, it is necessary to separately add a data version in which the use amount of the special ink is defined, in addition to the normal print data, and to send a special command for instructing the printing apparatus for using the special ink, etc.

By the way, a general application for causing a printing apparatus to perform printing based on image data is not compatible with special inks. Therefore, in a case of using a special ink, it is necessary to make the application compatible. In Japanese Patent No. 6322557, there is proposed a technology in which a special color ink, such as a white ink or clear ink, is represented by a replacement color, which is a normal color replacing the special color ink, and the printing of the replacement color will be performed with the special color ink at the time of printing.

Such an application is installed, not only in general-purpose personal computers, but also in various terminals such as various kinds of mobile terminals including smartphones, so that various kinds of data including a print instruction are output from these terminals. Note that, in some terminals, lossy compression such as Jpeg is performed on the image data in order to reduce the weight of the data.

However, in the technology disclosed in Japanese Patent No. 6322557, there has been a risk that, in a case where an RGB value deviates from the designated replacement color due to lossy compression, the color cannot be reproduced properly, and thus the effect that occurs by using the special color ink in the print product cannot be obtained.

SUMMARY OF THE INVENTION

The invention of the present application has been made in view of the above-described problems, and the object thereof is to provide a technology capable of surely obtaining the effect that occurs by using a special ink in a print product even if image data is compressed by a lossy compression system.

In the first aspect of the present invention, there is provided an information processing apparatus including:

a conversion unit configured to convert image data into density data by use of a predetermined look-up table, in which, in RGB color coordinates, each of a plurality of grid points that are defined by dividing each axis of RGB is associated with a combination of density values respectively corresponding to a plurality of inks to be used by a printing apparatus, the image data being represented by luminance values of RGB, the density data being represented by density values respectively corresponding to the plurality of inks, wherein, in the predetermined look-up table, the plurality of grid points include a first grid point, at which a density value of a predetermined ink among the plurality of inks does not correspond to 0, and a second grid point, at which the density value of the predetermined ink corresponds to 0, and wherein the first grid point does not exist at points adjacent to each other in the plurality of grid points.

In the second aspect of the present invention, there is provided an information processing method including:

converting image data into density data by use of a predetermined look-up table, in which, in RGB color coordinates, each of a plurality of grid points that are defined by dividing each axis of RGB is associated with a combination of density values respectively corresponding to a plurality of inks to be used by a printing apparatus, the image data being represented by luminance values of RGB, the density data being represented by density values respectively corresponding to the plurality of inks, wherein, in the predetermined look-up table, the plurality of grid points include a first grid point, at which a density value of a predetermined ink among the plurality of inks dose not correspond to 0, and a second grid point, at which the density value of the predetermined ink corresponds to 0, and wherein the first grid point does not exist at points adjacent to each other in the plurality of grid points.

In the first aspect of the present invention, there is provided a non-transitory computer readable storage medium storing a program for causing a computer to function as an information processing apparatus, the information processing apparatus including:

a conversion unit configured to convert image data into density data by use of a predetermined look-up table, in which, in RGB color coordinates, each of a plurality of grid points that are defined by dividing each axis of RGB is associated with a combination of density values respectively corresponding to a plurality of inks to be used by a printing apparatus, the image data being represented by luminance values of RGB, the density data being represented by density values respectively corresponding to the plurality of inks, wherein, in the predetermined look-up table, the plurality of grid points include a first grid point, at which a density value of a predetermined ink among the plurality of inks dose not correspond to 0, and a second grid point, at which the density value of the predetermined ink corresponds to 0, and wherein the first grid point does not exist at points adjacent to each other in the plurality of grid points.

According to the present invention, the effect that occurs by using a special ink can be surely obtained in a print product even with use of image data that is compressed by a lossy compression system.

Further features of the present invention will become apparent from the following description of exemplary embodiments with reference to the attached drawings.

BRIEF DESCRIPTION OF THE DRAWINGS

FIG. 10 is a diagram illustrating the correspondence between RGB values of fluorescent spot colors and ink color separation values;

FIG. 12 is a diagram illustrating the correspondence between RGB values of normal colors and ink color separation values;

FIG. 14 is a LUT for ink color separation into normal colors;

FIG. 15 is a LUT for ink color separation that is compatible with fluorescent spot colors;

FIG. 18 is a diagram illustrating the correspondence between RGB values of fluorescent spot colors and ink color separation values in another embodiment;

DESCRIPTION OF THE EMBODIMENTS

Hereinafter, with reference to the attached drawings, explanations will be given of the examples of an embodiment of an information processing apparatus, an information processing method, and a storage medium. Note that it is not intended that the following embodiments limit the present invention, and every combination of the characteristics explained in the present embodiments is not necessarily essential to the solution in the present invention. Further, the relative positions, shapes, etc., of the configurations described in the embodiments are merely examples and are not intended to limit this invention to the range of the examples.

First Embodiment

First, with reference to FIG. 1 through FIG. 17, an explanation will be given of an information processing apparatus according to the first embodiment. Note that, although printing using a fluorescent ink will be explained as an example in the present embodiment, the same processing will also be performed in a case where printing using a metallic ink is performed.

<Printing System>

Figure 1:
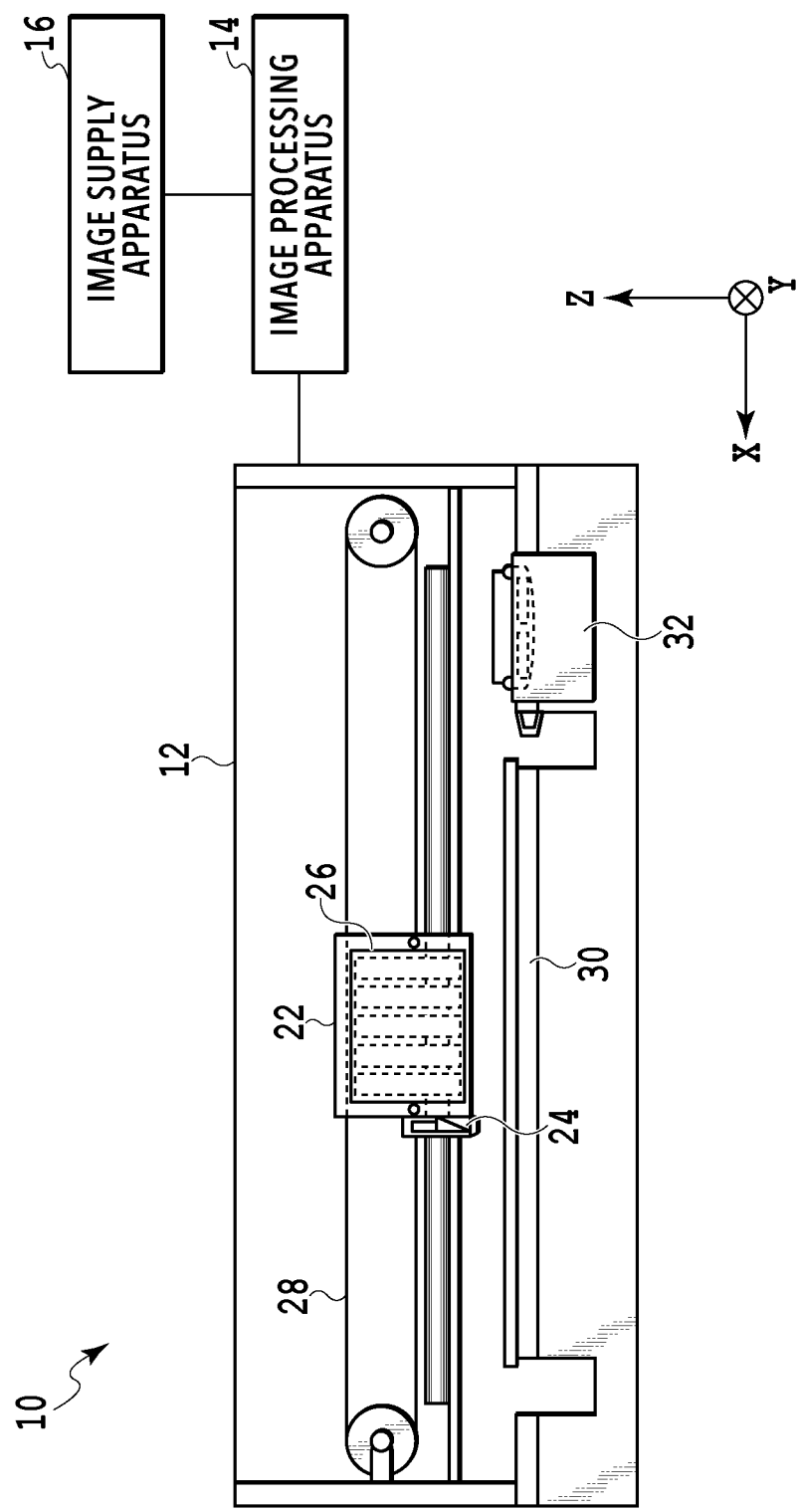
FIG. 1 is a schematic configuration diagram of a printing system.
Figure 2:
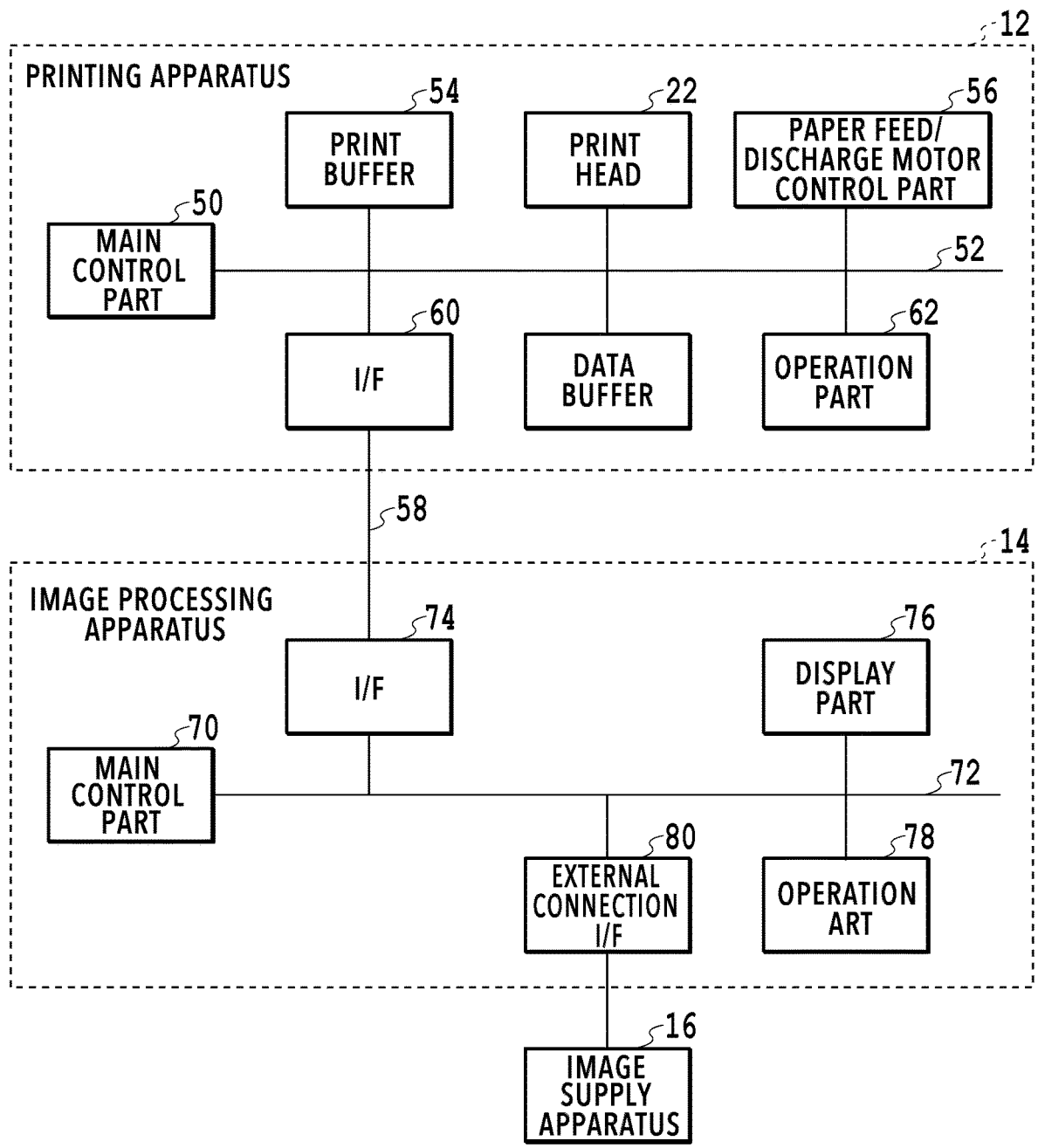
FIG. 2 is a block configuration diagram of a printing apparatus and an image processing apparatus.

FIG. 1 is a schematic configuration diagram of the printing system 10 including an information processing apparatus according to the first embodiment. FIG. 2 is a block configuration diagram of an image processing apparatus and a printing apparatus. The printing system 10 includes the inkjet printing apparatus (hereinafter referred to as the "printing apparatus") 12 which performs printing on a print medium by an inkjet system and the image processing apparatus 14 which outputs image data to the printing apparatus 12. The image supply apparatus 16 is connected to the image processing apparatus 14.

The image processing apparatus 14 can execute editing, such as setting an area of fluorescent color development with use of a fluorescent ink, on supplied image data, so as to output image data on which image processing based on such editing is performed to the printing apparatus 12. The printing apparatus 12 creates print data based on the image data that is output from the image processing apparatus and performs printing on the print medium, based on the print data. Although the image data is supplied from the image supply apparatus 16 to the image processing apparatus 14 in the present embodiment, such a form in which the image data is created in the image processing apparatus 14 is also possible.

=Printing Apparatus=

The printing apparatus 12 includes the print head 22 which includes five rows of nozzle arrays 34 (which will be described later) and the carriage 26 which is equipped with the optical sensor 24 (see FIG. 1). The carriage 26 is connected to the belt 28 which is driven by a driving force of a carriage motor (not illustrated in the drawings) and is configured to be able to reciprocate in the X direction by the driving of this belt 28. Further, the printing apparatus 12 includes a conveyance part (not illustrated in the drawings) capable of conveying the print medium in the Y direction.

Based on the print data, the printing apparatus 12 ejects ink from the respective nozzles of the nozzle arrays 34 in the print head 22 while the carriage 26 moves in the X direction relative to the print medium which is conveyed by the conveyance part. Accordingly, an image corresponding to one scan is printed on the print medium which is supported by the platen 30. Thereafter, the print medium is conveyed by the conveyance part by a distance corresponding to the printing width of one scan, and ink is ejected on the conveyed print medium for printing of one scan while moving the carriage 26 in the X direction. In this way, printing based on print data on a print medium is performed by alternately repeating the print operation for printing while moving the carriage 26 and the conveyance operation for conveying the print medium.

The optical sensor 24 performs a detecting operation while moving together with the carriage 26, so as to determine whether or not a print medium is present on the platen 30. Further, in the printing apparatus 12, the maintenance part 32 for performing the maintenance processing for the print head 22 is arranged at a position away from the platen 30 in an area scannable by the carriage 26.

The printing apparatus 12 includes the main control part 50 that controls the entire printing apparatus 12 (see FIG. 2). The main control part 50 is configured with a CPU, ROM, RAM, etc., and controls each configuration of the printing apparatus 12 that is connected to the data bus 52. Further, the printing apparatus 12 includes the print buffer 54 which is capable of storing print data before being transferred to the print head 22 as raster data and the print head 22 which includes multiple nozzles for ejecting ink. The print head 22 is capable of ejecting five colors of ink, i.e., the four normal color inks of cyan (C), magenta (M), yellow (Y), and black (K) and one fluorescent (F) color ink of fluorescent pink (FP).

The printing apparatus 12 includes the paper feed/discharge motor control part 56 which controls a paper feed motor, which drives a feeding part (not illustrated in the drawings) that feeds a print medium to the conveyance part, and a paper discharge motor, which drives a paper discharge part that discharges a printed print medium to a tray (not illustrated in the drawings). Further, the printing apparatus 12 includes the interface (I/F) 60 for connecting to the image processing apparatus 14 via the communication line 58 and the operation part 62 that receives an input from the user. The connection via the communication line 58 may be performed, not only with a LAN cable or a USB cable, but also with a USB hub, a wireless communication network using a wireless access point, or a Wi-Fi Direct (registered trademark) communication function, for example. For the operation part 62, a touch panel or the like can be used, for example.

As will be described in detail later, in the present embodiment, the main control part 50 converts the image data (RGB data) that is output from the image processing apparatus 14 into subtractive color mixture ink data for the printing apparatus 12 (CMYK data) or ink data including a fluorescent ink (CMYKF data). RGB data is data in which a combination of the respective luminance values of red (R), green (G), and blue (B) for color expression by additive color mixture (superimposition of light) is defined for each pixel. CMYK data is data in which a combination of the respective density values of C, M, Y, and K for color expression by subtractive color mixture (superimposition of inks) is defined for each pixel. CMYKF data is data in which the density values of F are added to CMYK data. In the present specification, the process of converting a combination of the above-described RGB luminance values into an ink color separation value which is a combination of the above-described CMYK(F) density values for each pixel is referred to as the ink color separation process.

After performing predetermined image processing including such conversion with the main control part 50 to generate print data, the print data is transferred to the print head 22. Further, the main control part 50 drives the carriage motor, which moves the carriage 26 that is equipped with the print head 22 in the X direction, and also drives a conveyance motor (not illustrated in the drawings) that drives the conveyance part. Further, the print head 22 ejects ink to the conveyed print medium, based on the print data, so as to print an image.

When performing multipath printing, the main control part 50 performs a scanning order determination process after performing the predetermined image processing. This scanning order determination process is a process of thinning out an image of data after a quantization process by use of a mask pattern or the like, in order to generate print data corresponding to each scan.

The ink that can be ejected by the print head 22 is not limited to the five colors C, M, Y, K, and F (FP). Ink such as light cyan (Lc), light magenta (Lm), and gray (Gy) may be used for improving the image quality. In this case, print data for each of the colors is generated. In the present embodiment, not only C, M, and Y but also Lc, Lm, Gy, and K will be explained as subtractive color mixture inks.

In the present embodiment, the case in which the print head 22 ejects five colors of ink, i.e., the four normal color inks C, M, Y, and K and one fluorescent color ink FP, will be explained. As for the fluorescent ink, other than the fluorescent pink, fluorescent red (FR), fluorescent yellow (FY), fluorescent green (FG), and fluorescent blue (FB) may be used. Further, the fluorescent ink that can be ejected from the print head 22 is not limited to one color, and a configuration in which multiple fluorescent inks can be ejected from the print head 22 is also possible. As for the fluorescent ink, it is preferable to mount an ink whose hue angle of color development is close to that of the subtractive color mixture inks of the chromatic colors. The examples thereof include FP ink having a hue angle close to that of M ink, FY ink having a hue angle close to that of Y ink, and FB ink having a hue angle close to that of C ink.

Figure 3:
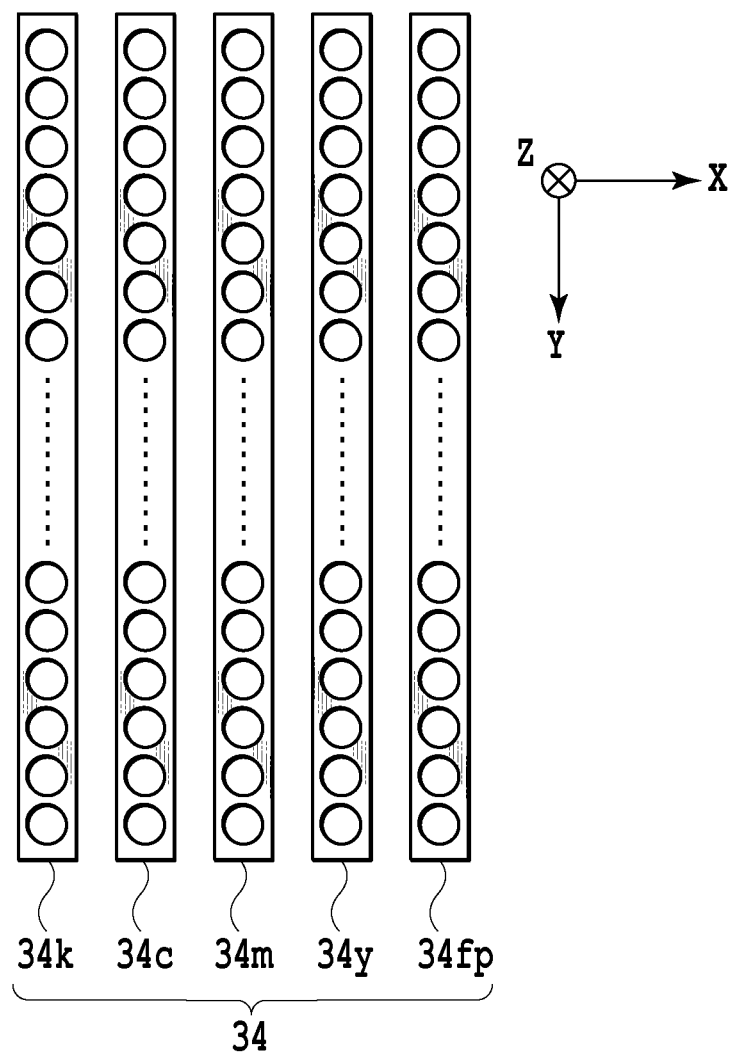
FIG. 3 is a diagram illustrating nozzle arrays of a print head.

On the plane (nozzle plane) of the print head 22 facing the print medium supported by the platen 30, a nozzle array in which nozzles for ejecting ink are arranged is formed for each ink color. FIG. 3 is a diagram illustrating the nozzle arrays formed on the nozzle plane of the print head 22 as viewed from the −Z direction. The print head 22 includes the nozzle arrays 34 in which nozzles for ejecting ink are arranged side by side along the Y direction for the each color C, M, Y, K, or FP. In the present embodiment, each of the nozzle arrays 34 has multiple nozzles arranged in the Y direction at a predetermined pitch (for example, 1200 dpi).

Specifically, the nozzle arrays 34 formed on the print head 22 include the nozzle array 34$c$ for ejecting C ink, the nozzle array 34$m$ for ejecting M ink, the nozzle array 34$y$ for ejecting Y ink, the nozzle array 34$k$ for ejecting K ink, and the nozzle array 34$fp$ for ejecting FP ink. Further, the respective nozzle arrays 34 are arranged along the +X direction in the order of the nozzle array 34$k$, the nozzle array 34$c$, the nozzle array 34$m$, the nozzle array 34$y$, and the nozzle array 34$fp$. Note that, although the nozzle arrays 34 are formed along the Y direction in the present embodiment, there is not a limitation as such. That is, the arrangement direction of the nozzle arrays 34 only needs to be the movement direction of the print head 22, that is, the direction intersecting the X direction.

=Image Processing Apparatus=

The image processing apparatus 14 includes the main control part 70 that controls the entire image processing apparatus 14 (see FIG. 2). The main control part 70 is configured with a CPU, ROM, RAM, etc., and controls each configuration of the image processing apparatus 14 connected to the data bus 72. Further, the image processing apparatus 14 includes the I/F 74 for connecting to the printing apparatus 12 via the communication line 58, the display part 76 which is capable of displaying the later-described display screen 1100, etc., and the operation part 78 which accepts an input from the user. Further, the image processing apparatus 14 includes the external connection I/F 80 for connecting to the image supply apparatus 16.

As the image processing apparatus 14, various kinds of mobile terminals or the like such as a general-purpose personal computer and a smartphone can be used, for example. In the image processing apparatus 14, the application program (hereinafter simply referred to as the "application") 86 and various kinds of control programs for the main control part 70 are installed. Such programs are executed by the main control part 70 under a predetermined operating system.

Figure 4:
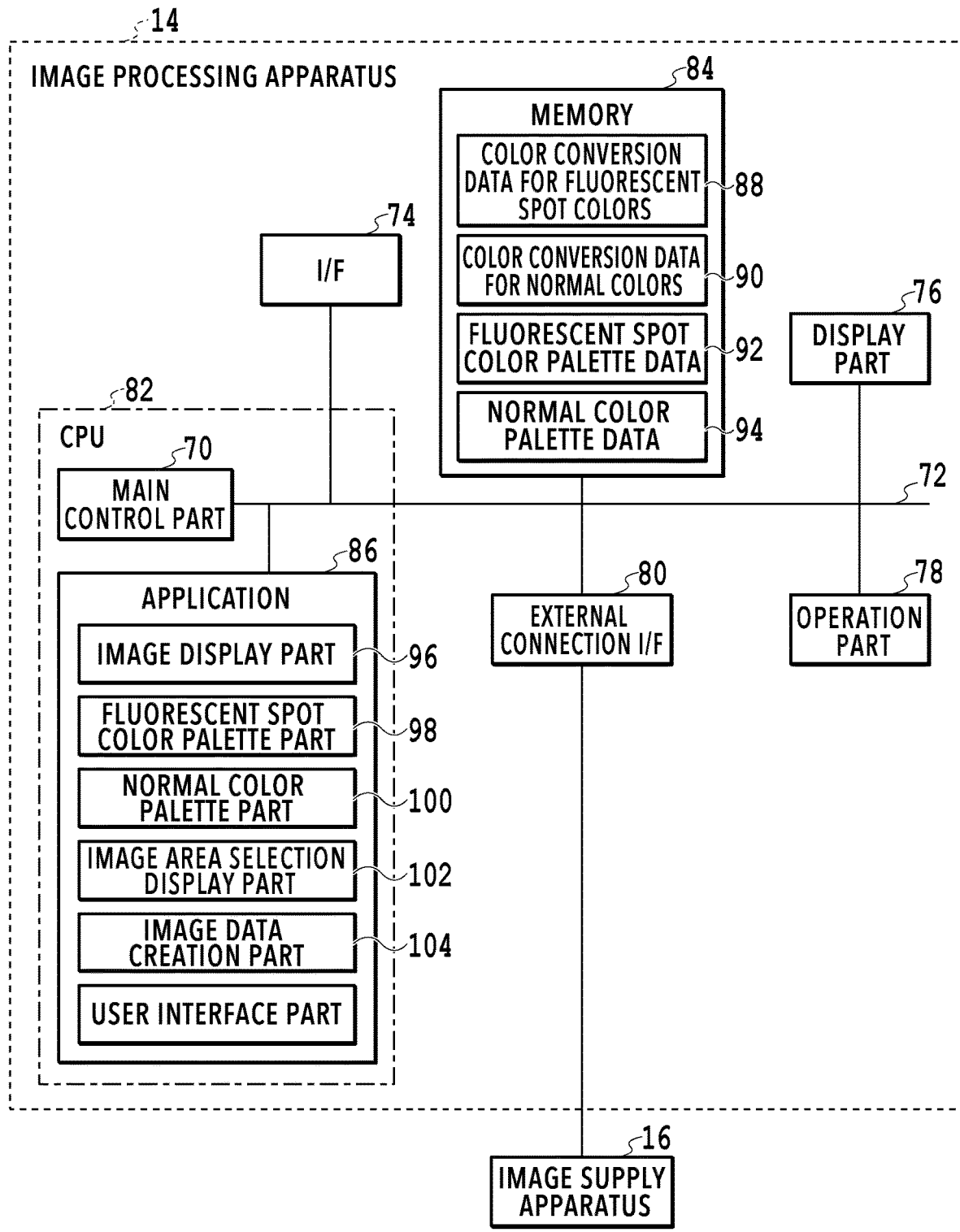
FIG. 4 is a block diagram illustrating a functional configuration in the image processing apparatus.

The image processing apparatus 14 will be explained in more detail with reference to FIG. 4. FIG. 4 is a diagram illustrating a functional configuration of the image processing apparatus 14. The image processing apparatus 14 includes the CPU 82, the memory 84, the I/F 74, the external connection I/F 80, the display part 76, and the operation part 78, and each configuration is connected via the data bus 72. Note that the CPU 82 configures the main control part 70.

The memory 84 stores the color conversion data 88 for the fluorescent spot color, which is used at the time of color conversion of the fluorescent spot color, and the color conversion data 90 for the normal colors, which is used at the time of color conversion of the normal colors. The image processing apparatus 14 edits the image data so that printing on an area to be highlighted or the like is performed with the fluorescent ink in a print product to be printed. In the present specification, the color of the fluorescent ink used for printing in such an area to be highlighted is referred to as the "fluorescent spot color". Further, the normal colors are C, M, Y, and K.

Further, the memory 84 stores the fluorescent spot color palette data 92 and the normal color palette data 94 to be displayed on the display screen 1100. In the present embodiment, the fluorescent spot color palette data 92 is color palette data in which the FP ink is set as a definition color. Further, the normal color palette data 94 is color palette data in which C, M, Y, and K inks are set as definition colors.

The application 86 is a program for realizing an image editing function. In the present embodiment, the application 86 is provided with a fluorescence spot color selection display function that enables selection of the fluorescence spot color that is reproduced in a print product to be printed by the printing apparatus 12 in the image data. Although this fluorescent spot color selection display function is incorporated in a dedicated application in advance for implementation, the fluorescence spot color selection display function can also be implemented by a general-purpose application since the RGB values designated for the fluorescent spot color are defined as described later.

In order to implement the fluorescent spot color selection display function, the application 86 includes the image display part 96, the fluorescent spot color palette part 98, the normal color palette part 100, the image area selection display part 102, the image data creation part 104, etc. Details of these functions will be described later. It is possible for the user to provide an instruction for printing an image based on the image data which is edited by the application 86 on a print medium via a GUI (Graphical User Interface) that is provided by the application 86. Further, in the image to be printed, it is possible to designate an area to be printed with the fluorescent spot color.

With the image display part 96, the application 86 displays the display screen 1100 (which will be described later) on the display part 76. This display screen 1100 has various kinds of display functions as described later, and the fluorescent spot color palette part 98 displays the fluorescent spot color palette, and the normal color palette part 100 displays the normal color palette. The displayed fluorescent spot color is based on the fluorescent spot color palette data, and the displayed normal colors are based on the normal color palette data 94. Further, in the image displayed on the display screen 1100, the image area selection display part 102 clearly indicates the area selected in response to an input from the user.

Further, in a case where the application 86 receives an instruction for printing from the user, the image data creation part 104 creates image data to be output to the printing apparatus 12, based on the contents edited on the display screen 1100. In the present embodiment, the image data is reduced in data size by lossy compression such as Jpeg. Further, the edited data is saved as needed. For saving the edited data, the data size may be reduced by using lossy compressed data such as Jpeg. In this case, the saved data itself, whose data size was reduced, is the image data. The created image data is transmitted to the printing apparatus 12 via the I/F 74. In the present embodiment, the image data created by the image data creation part 104 is image data in the RGB format.

<Characteristics of a Fluorescent Ink>

Figure 5:
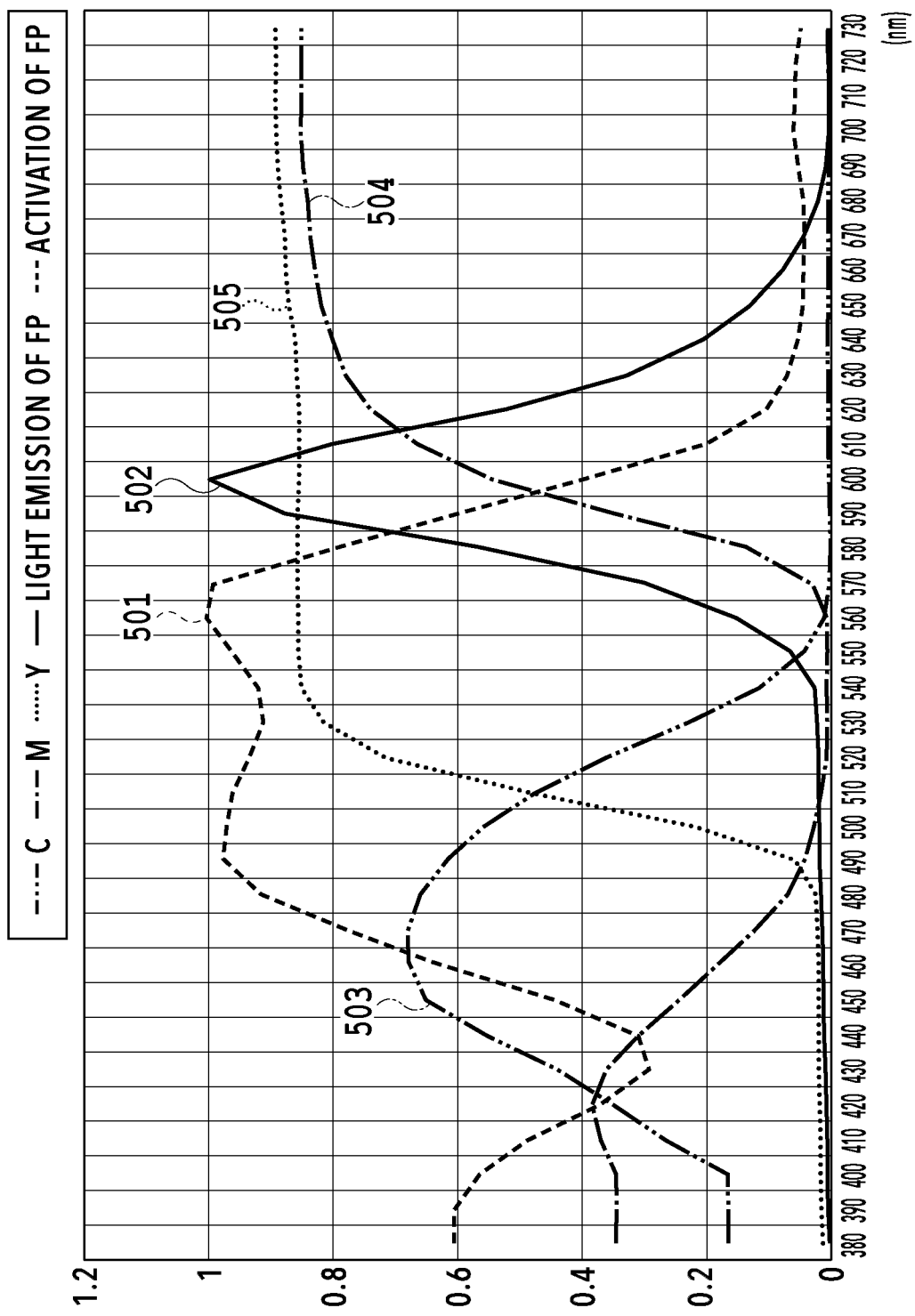
FIG. 5 are graphs illustrating the emission intensity of a fluorescent ink and the spectral reflectivities of normal inks.
Figure 6:
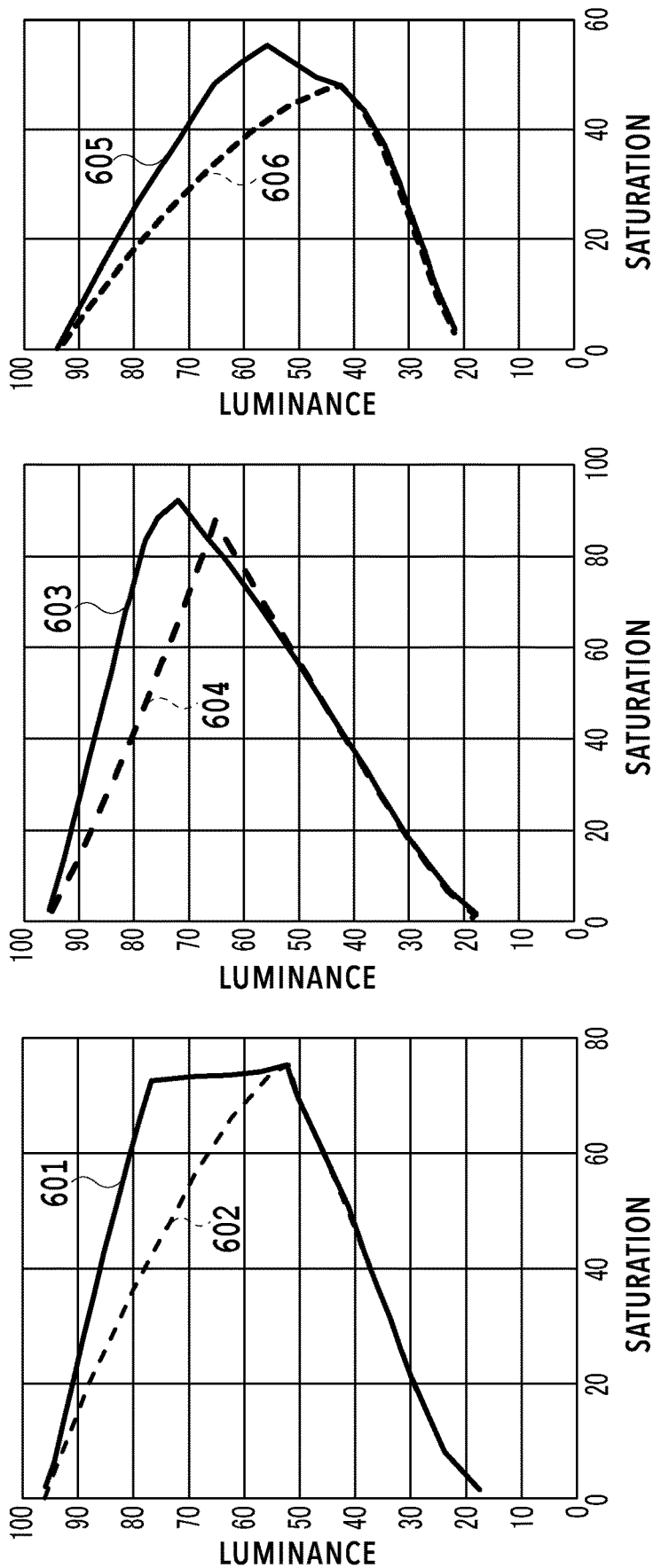
FIG. 6A to FIG. 6C are diagrams illustrating the color gamuts of a case where a fluorescent ink is used and a case where a fluorescent ink is not used.

A color material having fluorescent characteristics (hereinafter, also referred to as a "fluorescent color material") is a color material that absorbs light of an activation wavelength to become the activated state from the ground state and develops a color by emitting light of a light-emitting wavelength to return to the ground state. Here, FIG. 5 represents graphs indicating the intensity of activation and the intensity of light emission in a case where printing with the FP ink is performed on a print medium and graphs indicating the spectral reflectivities of printing with the C ink, M ink, and Y ink. In FIG. 5, the horizontal axis indicates wavelength of light, the vertical axis indicates intensity, and the intensity of activation is indicated with the dashed line 501, and the intensity of light emission is indicated with the solid line 502. In this FIG. 5, the intensities of light detected in a case of changing the wavelength of the light irradiating a sample image, which is printed with the FP ink, and changing the wavelength of the light that is received from the sample image, respectively, are illustrated.

Regarding the light emission, the intensity of the light received from the sample image in a case where the sample image is irradiated with light having a wavelength that causes activation is represented for each wavelength. The solid line illustrated in FIG. 5 is a graph in a case where the sample image is irradiated with light of 480 nm. Further, regarding the activation, the wavelength of the received light is fixed, so that the intensity of the received light in a case where the wavelength of the light irradiating the sample image is changed is represented. The dashed line illustrated in FIG. 5 is a graph in a case where the wavelength of the received light is fixed at 600 nm.

As seen in the graph of FIG. 5, the range of wavelengths that cause activation of the FP ink printed on the print medium is on the short wavelength side while overlapping the range of wavelengths that cause light emission. In addition, activation has strength and weakness for each wavelength, and there are wavelengths that emit light efficiently and wavelengths that do not. Further, since the fluorescent color material emits light, the reflectivity at a light emission wavelength often exceeds "1". In the present embodiment, a color material having such characteristics is defined as a fluorescent color material.

In the above, although activation and light emission of the fluorescent pink have been explained in order to explain the characteristics of a fluorescent ink, it is also possible that a fluorescent ink that emits light of another wavelength is used as the fluorescent ink used in the present embodiment. For example, a fluorescent blue (FB) that emits light in the blue area (450 to 500 nm), a fluorescent green (FG) that emits light in the green area (500 to 565 nm), and a fluorescent yellow (FY) that emits light in the yellow area (565 to 590 nm) may be used. Moreover, a fluorescent orange (FO) or fluorescent red (FR) that emits light in the red area (590 to 780 nm) may be used. Further, a fluorescent color combining such fluorescent inks may be used. Furthermore, a fluorescent color whose color tone is adjusted by combining fluorescent inks having different activation wavelength intensities may be used. For example, a fluorescent pink that emits light in the orange area with weak activation in the blue area and strong activation in the green area or the like may be used.

<Subtractive Color Mixture Ink>

The printing apparatus 12 uses subtractive color mixture inks as the normal color inks (the inks other than a predetermined ink) to be used for printing. In the present embodiment, a subtractive color mixture ink is defined as an ink containing a color material that absorbs a predetermined light out of an irradiating light. For example, such subtractive color mixture inks are inks containing a color material with a spectral reflectivity such as cyan (C) which is indicated by the long dashed double-short dashed line 503 in FIG. 5, magenta (M) which is indicated by the long dashed short dashed line 504 in FIG. 5, or yellow (Y) which is indicated by the fine dashed line 505 in FIG. 5. A publicly-known method for measuring spectral reflectivities is used for the graphs indicating the spectral reflectivities of C, M, and Y, which are illustrated in FIG. 5. Unlike the fluorescent ink, the subtractive color mixture inks only absorb light, and thus their reflectivities do not exceed "1".

An explanation will be given of the case in which such subtractive color mixture inks and the FP ink are mixed on a print medium, with reference to FIG. 5. In a case where the FP ink and the Y ink are mixed, the color material of Y (see the dashed line 505) absorbs light in the range of wavelengths that cause activation (see the dashed line 501) of the color material of FP. Therefore, the color material of FP cannot be sufficiently activated since the light in the range of wavelengths that cause activation is absorbed by the color material of Y, and thus the light emission will be suppressed. Further, in a case where the FP ink and the C ink are mixed, the color material of C (see the long dashed double-short dashed line 503) absorbs light in the range of wavelengths that cause light emission (see the solid line 502) of the color material of FP. Therefore, the light emitted by the color material of FP is absorbed by the color material of C, and thus the light will be suppressed.

Further, in a case where the FP ink and the M ink are mixed, the color material of M (see the long dashed short dashed line 504) absorbs light in the range of wavelengths with high activation sensitivity of the color material of FP and also absorbs the light emission thereof. Note that, in a case where the FP ink and the K ink are mixed, the color material of K absorbs light in the range of wavelengths that cause activation of the color material of FP and also absorbs light in the range of wavelengths that cause light emission thereof. Therefore, the activation of the color material of FP is suppressed, and the light emission is also suppressed.

That is, in a case where a subtractive color mixture ink and the FP ink are mixed, the contribution ratio of the subtractive color mixture ink to the color development of the FP ink decreases. These characteristics are greatly affected by the positional relationship between the FP ink and the subtractive color mixture ink on the paper surface. That is, the emission of the FP ink is more strongly affected by the subtractive color mixture ink in a case where the FP ink is in the lower layer of the subtractive color mixture ink than in a case where the FP ink is in the upper layer of the subtractive color mixture ink. As a result, the contribution ratio of the subtractive color mixture ink to the color development of the FP ink is smaller in a case where the FP ink is in the lower layer of the subtractive color mixture ink than in a case of being in the upper layer thereof <Fluorescent Ink Used in the Embodiment>

Next, the fluorescent ink used in the present embodiment will be explained. In the present embodiment, a fluorescent ink prepared by blending a dispersion of a color material having fluorescent characteristics, a solvent, and an activator is used. A dispersion of a color material having fluorescence characteristic is a dispersion of a color material having the above-described fluorescence characteristics. For example, NKW-3207E (fluorescent pink aqueous dispersion: Nippon Fluorescent Chemicals), NKW-3205E (fluorescent yellow aqueous dispersion: Nippon Fluorescent Chemicals), etc., can be used as a dispersion of a color material having fluorescent characteristics. Note that the dispersion is not limited to the above-described dispersion and may be the dispersion of any color material having the above-described fluorescence characteristics.

A dispersion of a color material having fluorescent characteristics is blended with a known solvent and activator so that the dispersion of the color material is dispersed, in order to form ink. There is not a particular limitation regarding the dispersion system. For example, the ink in which a fluorescent color material is dispersed may be a fluorescent color material dispersion that is dispersed with a surfactant, a resin-dispersed fluorescent color material dispersion that is dispersed with a dispersed resin, or the like. It is also possible to use a combination of fluorescent color material dispersions prepared by different dispersion systems.

As the above-described surfactant, it is possible to use an anionic type, nonionic type, cationic type, amphoteric type, etc. As the above-described dispersed resin, it is possible to use any resin having water solubility or water dispersibility, and it is preferable to use a resin having a weight average molecular weight of 1,000 or more and 100,000 or less and, more preferably, 3,000 or more and 50,000 or less. As the above-described solvent, it is preferable to use an aqueous medium containing water or a water-soluble organic solvent, for example.

<Color Gamut Expansion Effect of Printing Using a Fluorescent Ink>

Next, with reference to FIG. 6A to FIG. 6C, an explanation will be given of the color gamut expansion effect of printing using a fluorescent ink with the example of the FP (fluorescent print) ink which exhibits the fluorescent characteristics explained with FIG. 5. Not only in a case of the single FP ink color but also in a case where the FP ink and another ink are combined, it is possible to have the color gamut expansion effect in which the light emission of the FP ink is not suppressed so much that an output with high color development can be obtained, depending on the combination. FIG. 6A is a cross-sectional view illustrating a color gamut at a hue of 350 degrees in a color space that can be expressed by the printing apparatus. FIG. 6B is a cross-sectional view illustrating a pink color gamut with a hue of 55 degrees. FIG. 6C is a cross-sectional view illustrating a violet color gamut with a hue of 315 degrees. In each of FIG. 6A to FIG. 6C, the vertical axis represents lightness and the horizontal axis represents saturation.

In FIG. 6A, the solid line 601 represents the color gamut in a case where the FP ink is used, and the dashed line 602 represents the color gamut in a case where the FP ink is not used. The color gamut illustrated in FIG. 6A is close to one with the hue of a case where printing is performed with the single FP ink color. In FIG. 6B, the solid line 603 represents the color gamut in a case where the FP ink is used, and the dashed line 604 represents the color gamut in a case where the FP ink is not used. In the color gamut expanded as indicated by the solid line 603, printing is performed mainly with the FP ink and Y ink. In FIG. 6C, the solid line 605 represents the color gamut in a case where the FP ink is used, and the dashed line 606 represents the color gamut in a case where the FP ink is not used. In the color gamut expanded as indicated by the solid line 605, printing is performed mainly with the FP ink and C ink.

In particular, the combination with the yellow ink (Y ink), which has the smallest effect of suppressing the light emission of the fluorescent pink among the C ink, M ink, and Y ink, suppresses the color development the least, and thus the color gamut can be expanded on the lightness side with respect to the orange color.

<Image Printed with Use of a Fluorescent Ink>

Figure 7:
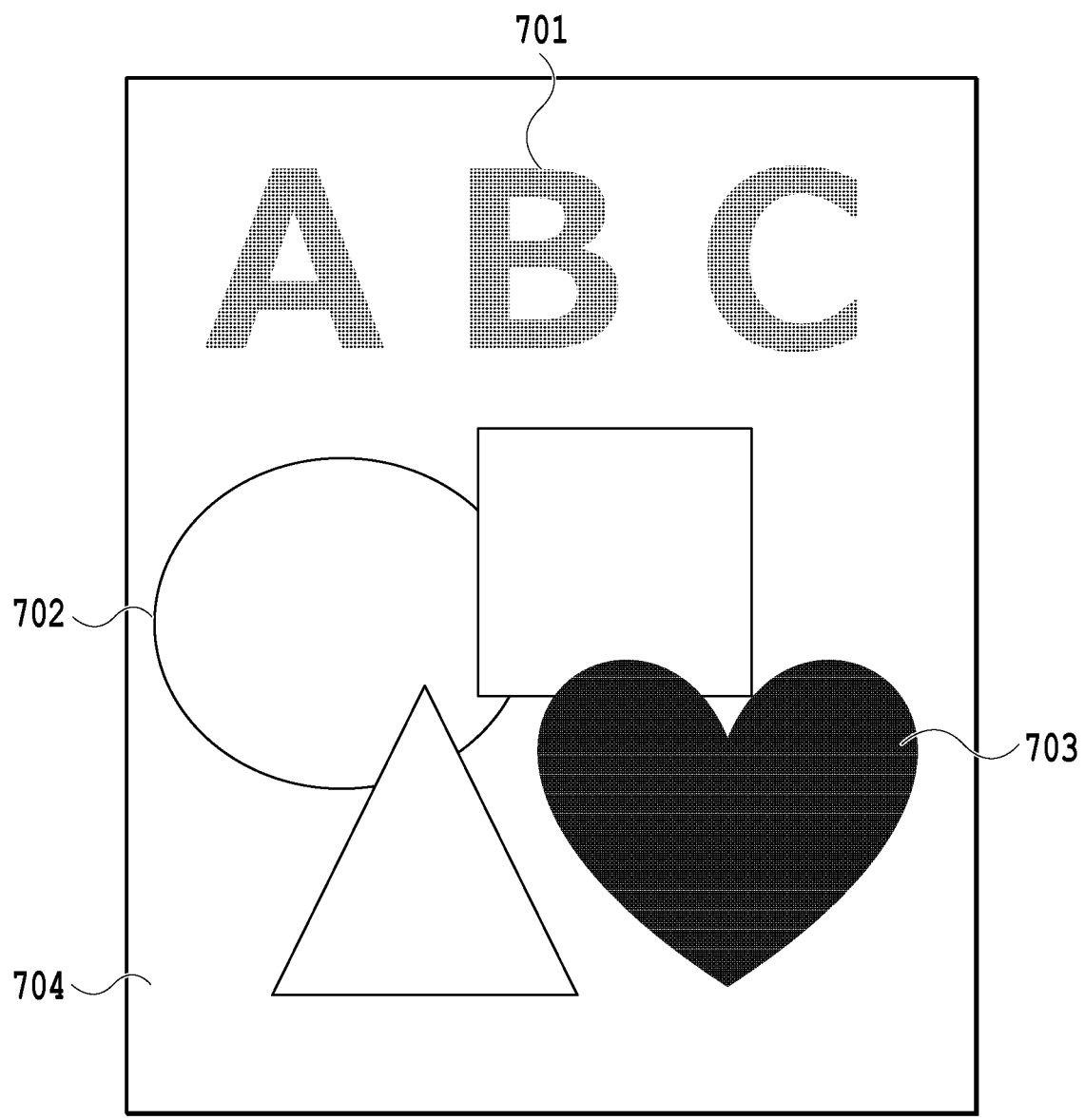
FIG. 7 is a diagram illustrating an image to be printed by the printing apparatus.
Figure 8:
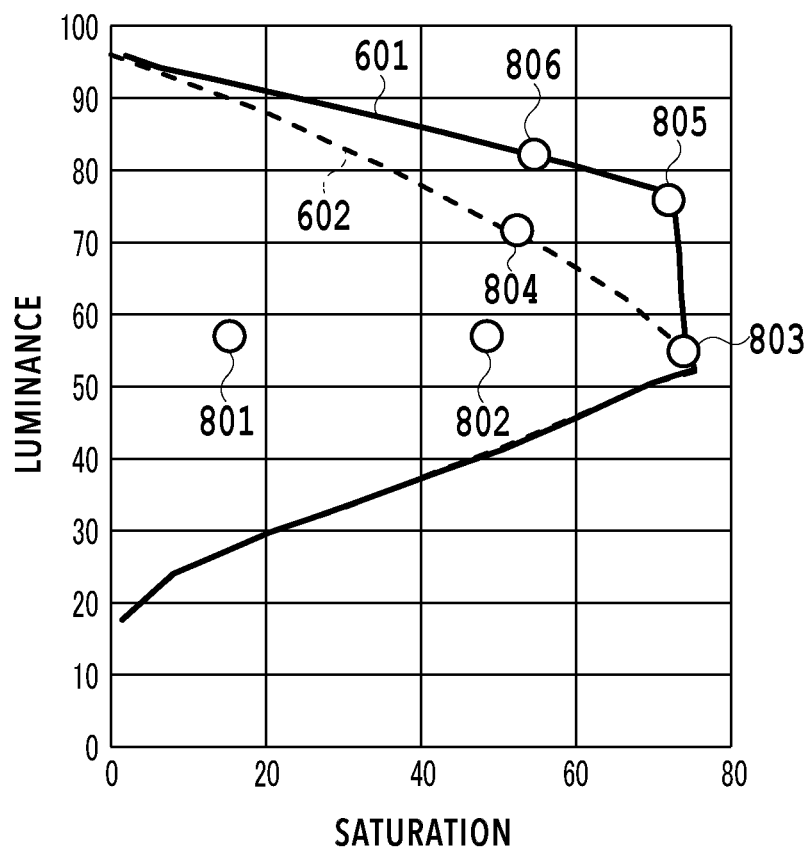
FIG. 8 is a diagram illustrating the distribution of colors to be used for printing.

Next, with reference to FIG. 7 and FIG. 8, an image printed with use of a fluorescent ink will be explained. FIG. 7 is a diagram illustrating an image printed by the printing apparatus. FIG. 8 is a diagram illustrating the distribution of the colors used for printing in the color gamut illustrated in FIG. 6A.

The image to be printed by the printing apparatus 12 is configured with the character part 701 in which the alphabet characters "A", "B", and "C" are arranged, the figure part 702 in which the circle, triangle, and square figures are arranged, the figure part 703 in which the heart figure is arranged, and the background part 704 which is the background thereof. In the present embodiment, the colors 801, 802, 803, 804, 805, and 806 are set for the respective parts of this image for printing. The colors 801, 802, 803, and 804 are colors included in the color gamut of colors that can be printed without using the FP ink, and the colors 805 and 806 are colors in the color gamut of colors that can be printed by using the FP ink.

In the printing without using the FP ink, that is, in the normal printing (printing using only the normal color inks), the character part 701 is printed with the color 804, the figure part 702 is printed with the color 802, the figure part 703 is printed with the color 803, and the background part 704 is printed with the color 801 according to the setting. On the other hand, in the printing using the FP ink, the character part 701 is printed with the color 806, the figure part 702 is printed with the color 802, the figure part 703 is printed with the color 805, and the background part 704 is printed with the color 801 according to the setting. The colors 805 and 806 which are used for the character part 701 and the figure part 703 are colors that cannot be printed without using the FP ink and will be printed as brighter and more vivid colors than the colors 801 and 802 which are used for the figure part 702 and the background part 704. Therefore, in a print product printed with use of the FP ink, the character part 701 and the figure part 703 are visually recognized in a highlighted manner by a person who sees the print product. That is, in this case, the colors 805 and 806 are the fluorescent spot colors.

In general, in the application that creates image data to be output to the printing apparatus 12, only RGB data is used. Therefore, in such an application, it is not possible to create image data for printing using a special ink (the predetermined ink) such as a fluorescent ink or metallic ink. Therefore, RGB values are set for the colors expressed with the special ink.

Specifically, since only RGB values can be handled in a normal application, first, specific RGB values are set in advance for the ink color separation values to be used as fluorescent spot colors in the printing apparatus 12. These RGB values are held in the printing apparatus 12 as well. Accordingly, it is possible to use multiple combinations as a color palette. For the use as a color palette, the colors need to be sufficiently separated so that the respective output colors can be distinguished as different colors. Note that, in the present embodiment, the fact that output colors, i.e., colors for printing, can be distinguished by a person between two colors is referred to as "having color separability".

In the present embodiment, the following three fluorescent spot colors are used for easy understanding. The fluorescent spot color 1 is a color to be printed with the ink color separation value (density values) of C=0%, M=0%, Y=0%, K=0%, and FP=100%. The fluorescent spot color 2 is a color to be printed with the ink color separation value of C=0%, M=0%, Y=0%, K=0%, and FP=80%. The fluorescent spot color 3 is a color to be printed with the ink color separation value of C=0%, M=0%, Y=0%, K=0%, and FP=60%.

Note that, although the ink color separation values are expressed as percentages for the sake of convenience in the present specification, the ink color separation values are expressed with use of signal values in practice. For example, in a case of converting into 16-bit gradation values, 100% corresponds to "65535", and, in a case of converting into 8-bit gradation values, 100% corresponds to "255".

Figure 9:
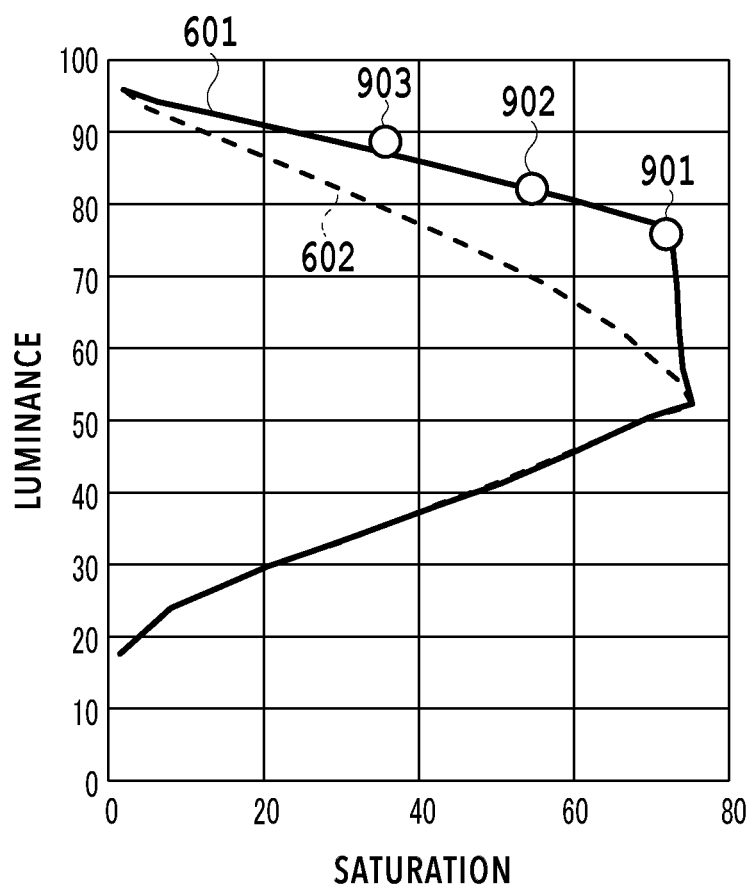
FIG. 9 is a diagram illustrating the distribution of colors to be fluorescent spot colors.

FIG. 9 is a diagram illustrating the distribution of the fluorescent spot colors 1, 2, and 3 in the color gamut illustrated in FIG. 6A. The fluorescent spot colors 1, 2, and 3 correspond to the colors 901, 902, and 903 of FIG. 9. As illustrated in FIG. 9, each of the fluorescent spot colors 1, 2, and 3 is a color that cannot be reproduced without using the FP ink. Therefore, by printing with use of the fluorescent spot colors 1, 2, and 3, it is possible to produce a print product in which a specific area is highlighted. Note that the colors of the fluorescent spot colors 1, 2, and 3 are sufficiently separated from each other so that the respective colors can be distinguished as different colors, that is, the fluorescent spot colors 1, 2, and 3 have color separability.

In order to perform printing of the fluorescent spot colors 1, 2, and 3, the RGB values defined (set) for the respective fluorescent spot colors are determined in advance as illustrated in FIG. 10, for example. FIG. 10 is a table in which the RGB values defining the fluorescent spot colors 1, 2, and 3 are associated with the ink color separation values indicating the output fluorescent spot colors. Specifically, in FIG. 10, the ink color separation value of the fluorescent spot color 1, i.e., (C, M, Y, K, FP)=(0, 0, 0, 0, 100%), are associated with the RGB value defining the fluorescent spot color, i.e., (R, G, B)=(255, 0, 255). Further, the ink color separation value of the fluorescent spot color 2, i.e., (C, M, Y, K, FP)=(0, 0, 0, 0, 80%), is associated with the RGB value defining the fluorescent spot color, i.e., (R, G, B)=(255, 51, 255). Furthermore, the ink color separation values of the fluorescent spot color 3, i.e., (C, M, Y, K, FP)=(0, 0, 0, 0, 60%), is associated with the RGB values defining the fluorescent spot color, i.e., (R, G, B)=(255, 102, 255). The table illustrated in FIG. 10 is stored, not only in a storage area of the printing apparatus 12 (the ROM of the main control part 50 or the like), but also in the memory 84 of the image processing apparatus 14 as the color conversion data 88 for fluorescent spot colors. Note that the information stored as the color conversion data 88 for fluorescent spot colors may be at least the RGB values defined as the fluorescent spot colors.

Details of the RGB values assigned to the respective fluorescent spot colors will be described later. As described above, in the present embodiment, since it is not necessary for the user to set RGB values for fluorescent spot colors, the user can execute the image processing without feeling a burden.

<Creation of Image Data Using the Application>

Figure 11:
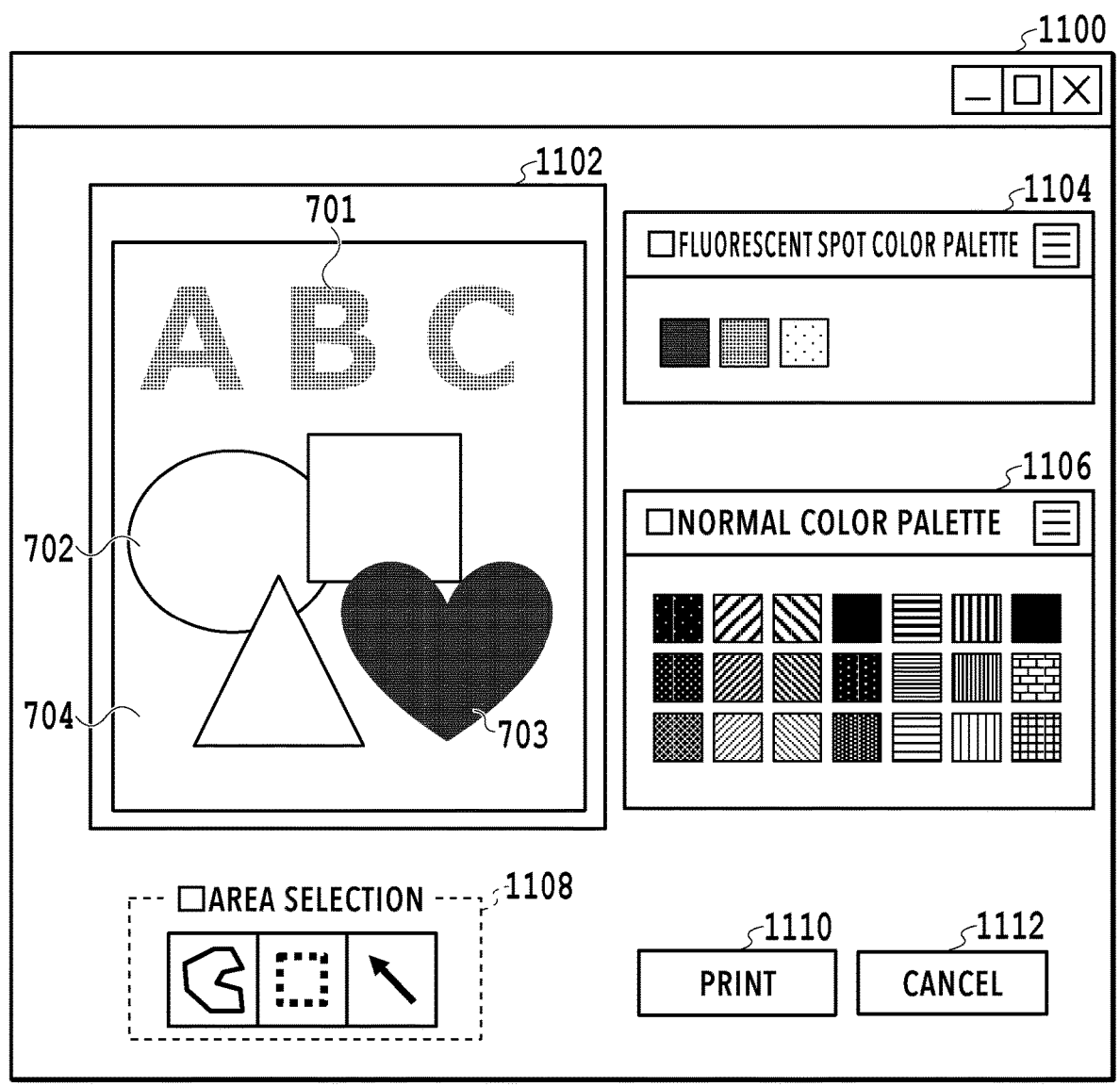
FIG. 11 is a diagram illustrating a display screen.

Next, with reference to FIG. 11, the creation of image data for printing with use of the fluorescent ink will be explained. FIG. 11 is a diagram illustrating an example of a display screen displayed on the display part by the application. FIG. 12 is a table illustrating the RGB values that are set as the colors to be displayed in the normal color palette part. In this FIG. 12, the RGB values and ink color separation values are associated with the normal colors to be displayed. The information illustrated in FIG. 12 is stored in the memory 84 as the color conversion data 90 for normal colors. In the following explanation, the case in which editing for performing printing with use of the fluorescent ink is executed on the image data for printing the image illustrated in FIG. 7 will be explained.

For creating image data for performing printing with use of the fluorescent ink, the display screen 1100 displayed on the display part 76 is utilized for designating the color of the fluorescent spot color, the area to be printed with the fluorescent spot color, etc. First, the configuration of the display screen 1100 will be explained.

The display screen 1100 includes the image display part 1102 that displays an image based on image data. In FIG. 11, the image illustrated in FIG. 7 is displayed. Further, the display screen 1100 includes the fluorescent spot color palette part 1104, in which a predetermined fluorescent spot color can be selected from multiple fluorescent spot colors, and the normal color palette part 1106, in which a predetermined normal color can be selected from multiple normal colors.

In the fluorescent spot color palette part 1104, the colors defined with RGB values for fluorescent spot colors are displayed based on the RGB values defined for the fluorescent spot colors 1, 2, and 3 in the table of FIG. 10. The color palette displayed in the fluorescent spot color palette part 1104 is stored in the memory 84 as the fluorescent spot color palette data 92, for example. The normal color palette part 1106 is a color palette which is defined based on RGB and is equivalent to that installed in an OS standard paint application or other normal applications. As illustrated in FIG. 12, the respective colors displayed in the normal color palette part 1106 are colors to be printed with sufficient color separability in a case of printing in practice.

The display screen 1100 includes the selection area setting part 1108 with which at least a partial area of the image displayed on the image display part 1102 is selected. An area of the image data is selected according to the area selected with the selection area setting part 1108. For example, editing such as changing the area selected with the selection area setting part 1108 into a given color displayed in the color palette is performed. Further, the display screen 1100 includes the print button 1110, which provides an instruction for execution of printing based on the edited image data, and the cancel button 1112, which cancels the processing.

The image to be printed by the printing apparatus 12 may be created based on a template prepared in advance in the application or may be created without using a template. It is assumed that given characters and figures can be arranged in the image to be printed. The function of creating an image to be printed utilizes a function that has already implemented in a general application. The image created in this way will be displayed in the image display part 1102 on the display screen 1100.

The image displayed in the image display part 1102 is configured with the character part 701, the figure parts 702 and 703, and the background part 704. Here, the user designates the figure part 702 by utilizing the selection area setting part 1108 and selects one color from the multiple colors displayed in the normal color palette part 1106. Further, the user designates the background part 704 by utilizing the selection area setting part 1108 and selects one color from the multiple colors displayed in the normal color palette part 1106. Accordingly, in the image displayed in the image display part 1102, the figure part 702 and the background part 704 are displayed in the selected colors, respectively.

Further, the user designates the character part 701 by utilizing the selection area setting part 1108 and selects the fluorescent spot color 1 (the middle in the drawing) from the multiple colors displayed in the fluorescent spot color palette part 1104. Accordingly, in the image display part 1102, the character part 701 is displayed in the color of the RGB value defined as the fluorescent spot color 1, i.e., (R, G, B)=(255, 0, 255). Further, the user designates the figure part 703 by utilizing the selection area setting part 1108 and selects the fluorescent spot color 2 (the left end in the drawing) from the multiple colors displayed in the fluorescent spot color palette part 1104. Accordingly, in the image display part 1102, the figure part 703 is displayed in the color of the RGB value defined as the fluorescent spot color 2, i.e., (R, G, B)=(255, 51, 255).

Further, the application 86 (the image data creation part 104) creates image data based on the image created by use of the display screen 1100. That is, image data (RGB data) including the RGB values corresponding to the fluorescent spot colors is created. The created image data is output to the printing apparatus 12 in a case where the print button 1110 is selected. In the image processing apparatus 14, the compression processing is performed by the image data creation part 104 on the image data that is output to the printing apparatus 12. In the present embodiment, the compression system is lossy compression such as Jpeg (Joint Photographic Experts Group).

Accordingly, since the colors displayed in the fluorescent spot color palette part 1104 are defined with RGB values in the present embodiment, it is possible to create image data for performing printing with a fluorescent spot color even in an application that is compatible only with RGB data Note that a function of a publicly-known application, not only a dedicated application, can be used by obtaining information of fluorescent spot colors and RGB values associated with each other.

<Generation of Print Data>

Figure 13:
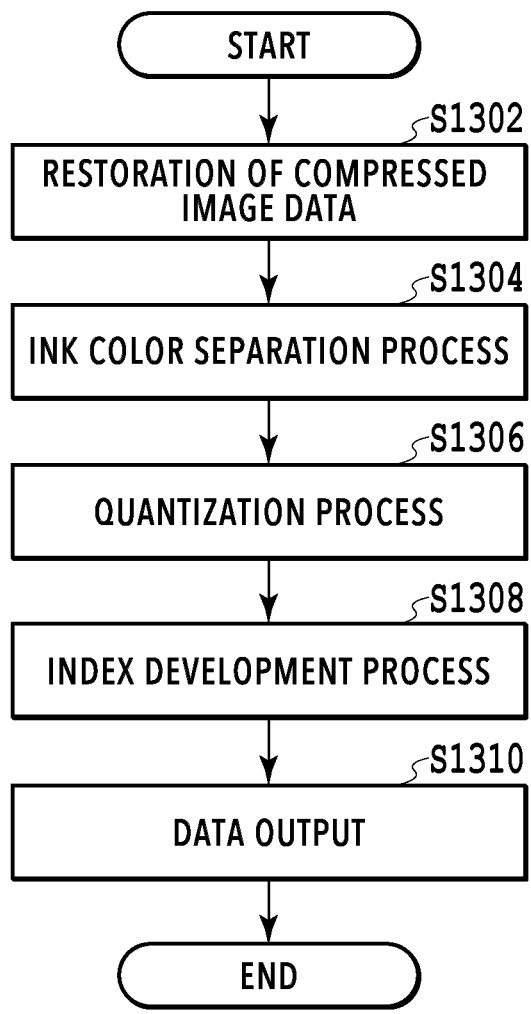
FIG. 13 is a flowchart illustrating details of processing of print data generation processing.

Next, the processing of generating print data based on image data that is output from the image processing apparatus 14 will be explained. FIG. 13 is a flowchart illustrating details of processing of the print data generation processing. The series of processes illustrated in this flowchart of FIG. 13 is executed by the CPU of the main control part 50 loading a program code stored in the ROM of the main control part 50 into the RAM of the main control part 50 and executing the program code. Alternatively, a part or all of the functions in the steps of FIG. 13 may be executed by hardware such as an ASIC or an electronic circuit. Note that the sign "S" in the explanation of each process means that it is a step of the flowchart.

If the printing apparatus 12 receives image data and an instruction for starting printing from the image processing apparatus 14, the print data generation processing will be started, and printing on a print medium is executed based on the print data generated by the print data generation processing. If the print data generation processing is started, the main control part 50 first restores the compressed image data (S1302). Note that, since a publicly-known technology can be applied to the restoration of compressed data, a detailed explanation thereof will be omitted.

Next, the main control part 50 performs ink color separation process on the restored image data (S1304). In S1304, the RGB data, which is the restored image data, is separated into 16-bit gradation data (density data) for each of C, M, Y, K, and FP, which are the ink colors that can be printed by the printing apparatus 12. At this stage, 16-bit gray images are generated for 5 channels (5 colors). Accordingly, in S1304, the ink color separation process (the color conversion process) for separating (performing color conversion of) the RGB data of the image data into the density data, which consists of the density values of the multiple types of ink colors used in the printing apparatus 12, is performed. In the ink color separation process, the calculation is performed by performing an interpolation calculation with reference to a look-up table (LUT) that is stored in advance in the ROM or the like of the main control part 50. In the present embodiment, the conversion of the RGB values of the fluorescent spot colors into C, M, Y, K, and FP of the ink color separation values is performed by use of the LUT. This LUT and the conversion by use of the LUT will be described later.

Further, the main control part 50 performs a predetermined quantization process on the gradation data corresponding to each of the ink colors, so as to convert the gradation data into several-bit quantization data (S1306). For example, in a case of performing quantization into three values, the gradation data is converted into 2-bit data of level 0 to level 2. Thereafter, the main control part 50 performs the index development process (S1308) to output the data obtained as a result of the index development process as print data (S1310) and ends this print data generation processing. In S1308, one dot arrangement pattern that is associated with the level which is obtained in S1306 is selected from the multiple dot arrangement patterns in which the number and positions of dots to be printed in each pixel are determined. Here, the dot arrangement patterns may have a form in which the number of dots to be printed in the area corresponding to each pixel is different depending on the level value or a form in which the size of the dots is different depending on the level value.

In the present embodiment, the main control part 50 functions as the information processing apparatus that performs the ink color separation process (the color conversion process) on image data to convert the image data into density data of the ink colors to be used for printing.

A LUT is used in the ink color separation process of S1304. This LUT is created as described below. In the present embodiment, a 3D LUT having 4096 grid points, in which each of the RGB axes is divided at regular intervals so as to have 16 grid points in the RGB color coordinates, is created. Each grid point is associated with an ink color separation value, which is a combination of CMYK density values corresponding to the RGB values at the grid point. Based on each grid point in such a 3D LUT and the ink color separation values associated with the respective grid points, the LUT 1400, which is capable of performing ink color separation (color conversion) from RGB to CMYK for normal colors without using the FP ink as illustrated in FIG. 14, is created. FIG. 14 is a LUT for ink color separation into normal colors. A publicly-known technology can be applied to such a system for creating a LUT. Note that the FP values in the LUT 1400 are "0".

Next, based on the created LUT 1400, the LUT 1500 that also corresponds to the fluorescent spot colors is created (see FIG. 15). FIG. 15 is a LUT for ink color separation that also corresponds to the fluorescent spot color inks. For creating the LUT 1500 from the LUT 1400, the information in which the RGB values defining the fluorescent spot colors are associated with the ink color separation values indicating the output fluorescent spot colors (see FIG. 10) is used. Specifically, the grid point corresponding to the RGB values defined as a fluorescent spot color is replaced with the CMYKF values for outputting the fluorescent spot color, in which the ink color separation value of the output CMYKF (FP) values is defined. In FIG. 10, there are three defined fluorescent spot colors. Therefore, the LUT 1500 is created by replacing the output ink color separation values of the grid points corresponding to (R, G, B)=(255, 0, 255), (255, 51, 255), and (255, 102, 255) in the LUT 1400 with the associated values. Therefore, the respective RGB values defined as the multiple fluorescent spot colors match the grid points of the LUT and are RGB values that are different from each other. Further, the grid points corresponding to the respective RGB values defined as the multiple fluorescent spot colors are not adjacent to each other in the LUT.

Figure 16:
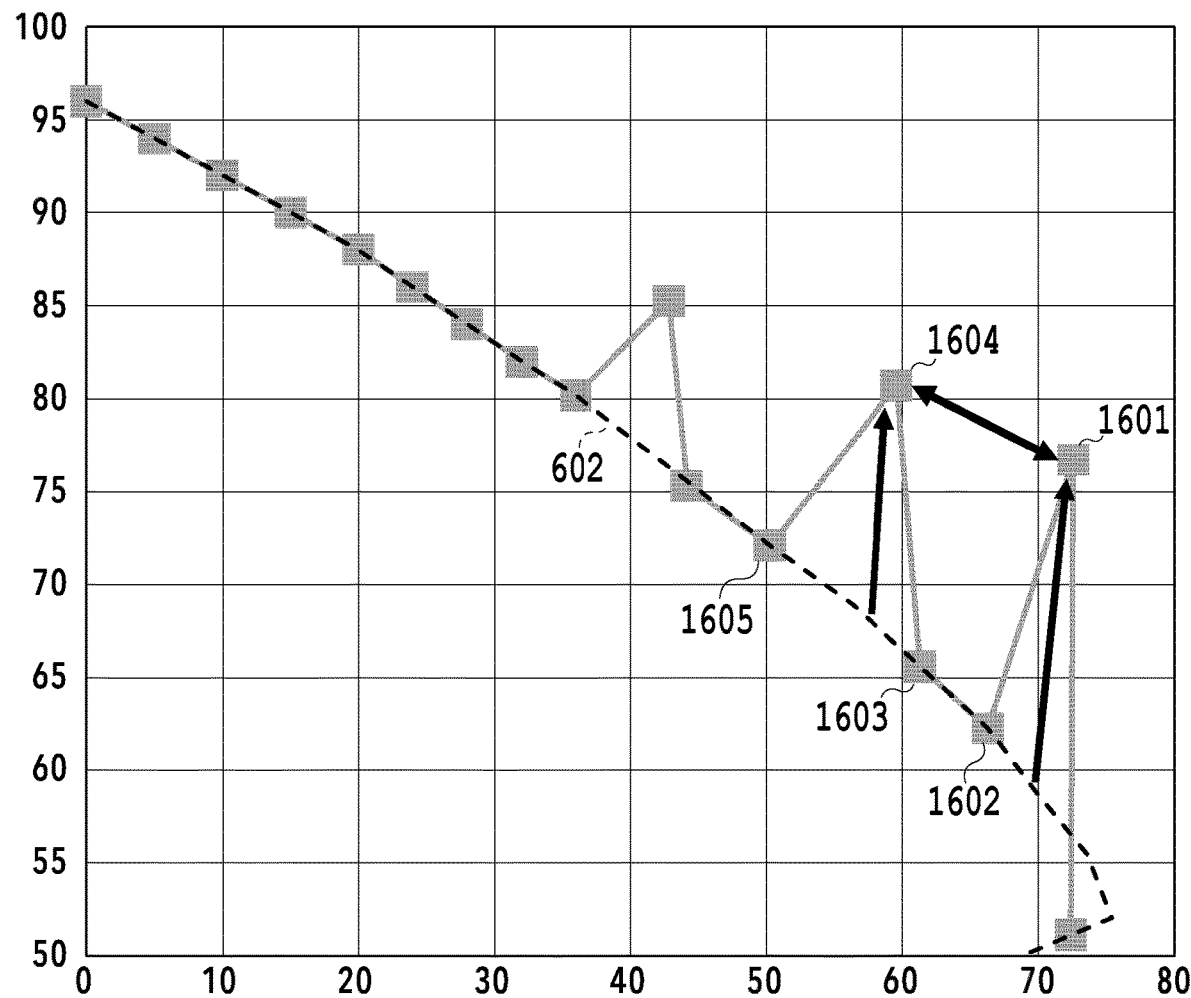
FIG. 16 is a diagram illustrating the distribution of colors at the time of printing of colors in the vicinity of the grid points corresponding to fluorescent spot colors.

By use of the LUT 1500 created in this way, the ink color separation process is performed in S1304. FIG. 16 is a diagram illustrating the distribution of the colors in the vicinity of the grid points corresponding to the fluorescent spot colors among the colors in the respective grid points of the LUT printed by the printing apparatus 12. FIG. 16 illustrates the color distribution based on measurement of colors in a case where printing of the RGB values being M(255, 0, 255) to W(255, 255, 255) is actually performed. The vertical axis represents lightness and the horizontal axis represents saturation. The color 1601 indicates the color printed at (R, G, B)=(255, 0, 255), the color 1602 indicates the color printed at (R, G, B)=(255, 17, 255), and the color 1603 represents the color printed at (R, G, B)=(255, 34, 255). Further, the color 1604 represents the color printed at (R, G, B)=(255, 51, 255), and the color 1605 represents the color printed at (R, G, B)=(255, 68, 255).

The FP ink is used for the grid points corresponding to the fluorescent spot colors, i.e., the color 1601 of (R, G, B)=(255, 0, 255) and the color 1604 of (R, G, B)=(255, 51, 255). Therefore, the colors 1601 and 1604 are output (printed) as colors with higher lightness as compared with the colors on the color gamut in which the FP ink is not used (the dashed line 602) such as the colors 1602, 1603, and 1605. The colors 1601 and 1604 are defined as separate colors in the color palette, so as to be output with sufficient color separability.

<Effects on the Influence by Lossy Compression>

The image data that is output to the printing apparatus 12 is compressed by the image data creation part 104 of the image processing apparatus 14 by a lossy compression system such as Jpeg. Therefore, there is a risk that the RGB values deviate at the time of the restoration of the compressed data in S1302 of the print data generation processing and thus the printing with use of the FP ink will not be performed.

Specifically, in the image display part 1102 of FIG. 11, the figure part 703 is displayed with (R, G, B)=(255, 0, 255) which is the fluorescent spot color 1. The image data reflecting this setting is compressed by Jpeg and output to the printing apparatus 12. Further, in the print data generation processing, for example, this image is restored as (R, G, B)=(255, 5, 255), which has deviated from the RGB values (255, 0, 255) defined as the fluorescent spot color 1. Similarly, the fluorescent spot color 2 of the character part 701, i.e., (R, G, B)=(255, 51, 255), is restored as (R, G, B)=(255, 46, 255), for example. The RGB value deviates from the RGB value (255, 51, 255) which is defined as the fluorescent spot color 2.

Figure 17:
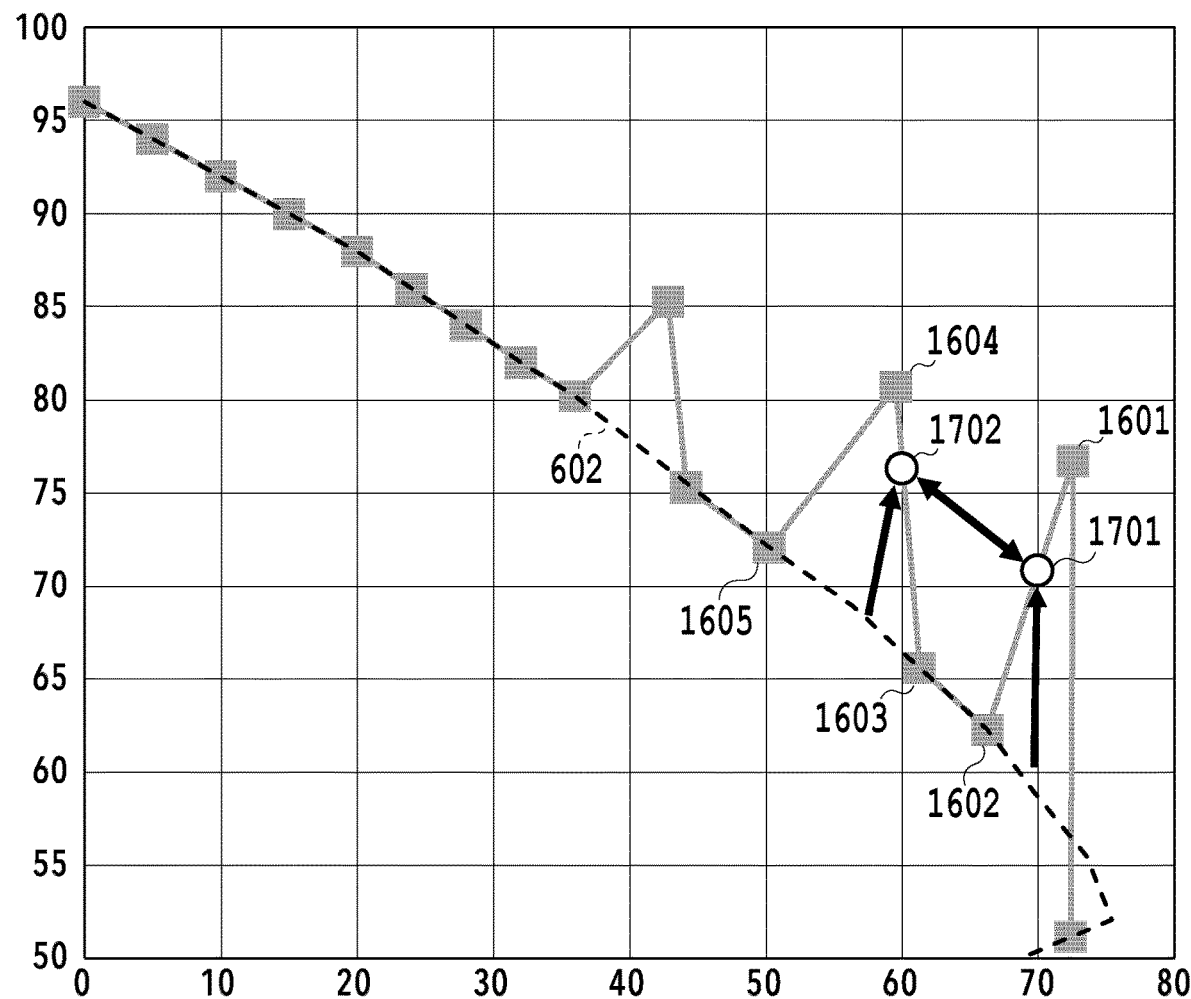
FIG. 17 is a diagram illustrating the distribution of colors at the time of printing fluorescent spot colors in a case where the RGB values deviate.

In the present embodiment, even if an RGB value deviates from the RGB value defined as a fluorescent spot color, the ink color separation is performed by the interpolation calculation using the LUT 1500 in the ink color separation process. Hereinafter, with reference to FIG. 17, the interpolation calculation using the LUT 1500 will be explained in detail. FIG. 17 is a diagram illustrating the distribution of the colors in the vicinity of the grid points corresponding to the fluorescent spot colors among the colors in the respective grid points of the LUT printed by the printing apparatus 12 in a case where RGB values deviate in the restoration of the data.

In a case where the RGB value of the fluorescent spot color 1 (255, 0, 255) deviates from the corresponding grid point to the RGB value (255, 5, 255), the color 1701 is output (printed) by the interpolation calculation which is performed based on the grid points sandwiching the deviated RGB value. Specifically, the interpolation calculation is performed by use of the respective ink color separation values of the two grid points, i.e., the grid point (255, 0, 255) and the grid point (255, 17, 255), so that the ink color separation value corresponding to the RGB value (255, 5, 255) will be obtained.

Further, in a case where the RGB value of the fluorescent spot color 2 (255, 51, 255) deviates from the corresponding grid point to the RGB value (255, 46, 255), the color 1702 is output by the interpolation calculation which is performed based on the grid points sandwiching the deviated RGB value. Specifically, the interpolation calculation is performed by use of the respective ink color separation values of the two grid points, i.e., the grid point (255, 34, 255) and the grid point (255, 51, 255), so that the ink color separation value corresponding to the RGB value (255, 46, 255) will be obtained.

In this way, since the RGB values deviate due to the restoration of the image data that is output from the image processing apparatus 14, the colors 1601 and 1604 of the fluorescent spot colors are output as the colors 1701 and 1702. These colors 1701 and 1702 are output as colors with higher lightness as compared with the colors on the color gamut (the dashed line 602) in which the FP ink is not used. Therefore, the effect of performing highlighted printing with the fluorescent spot colors can be maintained. That is, even if an RGB value on a grid point that indicates a fluorescent spot color deviates from the grid point in the process of compression and restoration, the grid point corresponding to the target fluorescent spot color is present in the vicinity of the deviated position. Therefore, the interpolation calculation using this grid point enables the value after the ink color separation process to be closer to the ink color separation value indicating the target fluorescent spot color. Further, since the grid points corresponding to the fluorescent spot colors are not adjacent to each other in the LUT, information of grid points corresponding to multiple fluorescent spot colors is not used in the interpolation calculation, so that the color separability between the fluorescent spot colors is guaranteed. For example, consider a case in which the fluorescent spot color 1 corresponds to the RGB value (255, 0, 255) and the fluorescent spot color 2 corresponds to an adjacent grid point such as the RGB value (255, 17, 255). In a case where the RGB value (255, 0, 255) deviates to the RGB value (255, 5, 255) at the time of restoration of the image data obtained by lossy compression, the output of the fluorescent spot color 1 is affected by the grid of the fluorescent spot color 2. In this case, sufficient color separability cannot be obtained between the fluorescent spot color 1 and the fluorescent spot color 2.

As explained above, in the present embodiment, regarding the LUT used in the ink color separation process, the density value of a fluorescent ink dose not correspond to 0 at the grid point corresponding to a fluorescent spot color and the density value of the fluorescent ink corresponds to 0 at the other grid points, and adjacent grid points do not correspond to fluorescent spot colors in this LUT. Further, if the RGB value defined as a fluorescent spot color deviates, the ink color separation value corresponding to the RGB value is obtained by performing an interpolation calculation based on multiple grid points sandwiching the RGB value.

Accordingly, even if image data is compressed by a lossy compression system, the effect of highlighting a specific area for printing in the print product by using a fluorescent ink can be surely obtained. Further, in a case where multiple fluorescent spot colors are expressed by using a fluorescent ink, the effect that the multiple fluorescent spot colors can be recognized as different colors can be surely obtained.

Second Embodiment

Figure 19:
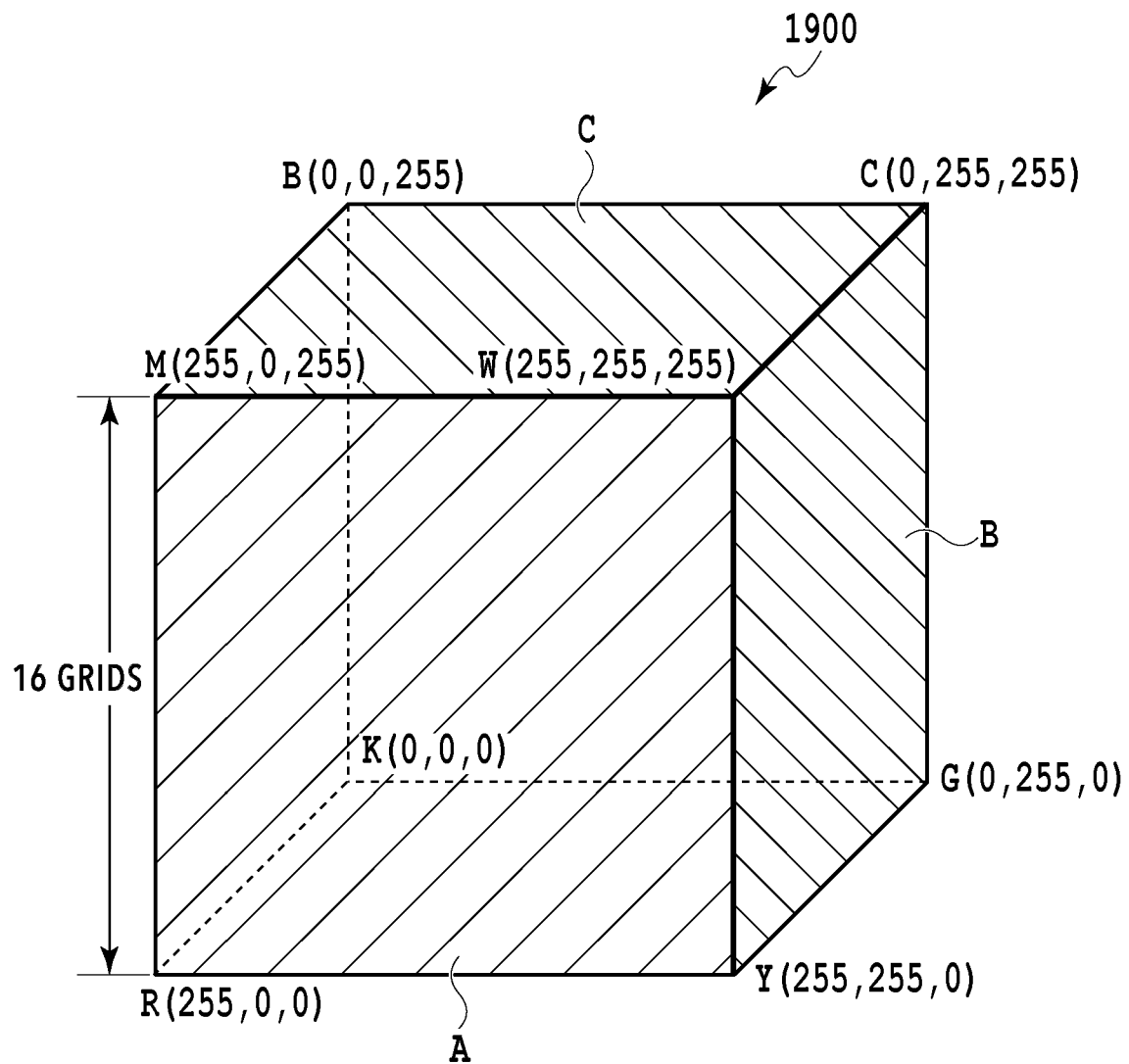
FIG. 19 is a 3D LUT indicating the planes on which the grid points corresponding to fluorescent spot colors exist.

Next, with reference to FIG. 18 and FIG. 19, an explanation will be given of the information processing apparatus according to the second embodiment. In the following explanation, the same or corresponding configurations as those of the information processing apparatus according to the first embodiment described above are assigned with the same signs as those used in the first embodiment, so as to omit detailed explanations thereof.

The second embodiment is different from the above-described first embodiment in an aspect that a fluorescent ink and a normal color ink are combined for printing as a fluorescent spot color. As explained in the first embodiment, the color gamut expansion effect can be obtained, not only with the single FP ink color, but also with a combination of the FP ink and another ink. Therefore, in the second embodiment, a case in which a fluorescent spot color is configured by combining the FP ink and the Y ink will be explained. Note that the combination of the fluorescent ink and the normal color ink is not limited to the FP ink and the Y ink.

FIG. 18 is a table in which the RGB values defined as the fluorescent spot colors are associated with the ink color separation values indicating the fluorescent spot colors to be output. In this table, RGB values and ink color separation values are associated with the respective fluorescent spot colors 1 to 12. Compared with the case of single FP ink color, the types of fluorescent spot colors can be increased in a case where the FP ink and the Y ink are used. Further, by using a fluorescent ink and an ink (normal color ink) other than the fluorescent ink, the types of fluorescent spot colors can be increased even though only one FP ink color is mounted as the fluorescent ink.

The RGB values and ink color separation values of the fluorescent spot colors as defined in FIG. 18 are created so that the fluorescent spot colors correspond to grid points of the LUT and the grid points associated with the fluorescent spot colors are not adjacent to each other. Note that this LUT is a LUT used at the time of the ink color separation process and is created based on the later-described 3D LUT 1900. Further, in this LUT, the RGB values defined as the fluorescent spot colors are converted into the ink color separation values in which the density values of the FP ink and the Y ink are greater than the density values of the other inks (the inks other than the FP and Y inks).

As illustrated in FIG. 6A to FIG. 6C, since the color gamut expansion effect of the FP ink is due to the influence of the light emission effect of the FP ink, the effect is large in a bright color gamut, but the effect is not large in a dark color gamut. Therefore, the grid points used as the fluorescent spot colors can be effectively assigned only to the following three areas in the 3D LUT 1900 (see FIG. 19). FIG. 19 is a 3D LUT indicating the planes on which the grid points corresponding to the fluorescent spot colors exist in the present embodiment.

Specifically, the three areas are the three planes A, B, and C of the 3D LUT 1900. The plane A is the outermost plane composed of (R, G, B)=(255, 0, 0), (255, 0, 255), (255, 255, 0), and (255, 255, 255). The plane B is the outermost plane composed of (R, G, B)=(0, 255, 0), (255, 255, 0), (0, 255, 255), and (255, 255, 255). The plane C is the outermost plane composed of (R, G, B)=(0, 0, 255), (255, 0, 255), (0, 255, 255), and (255, 255, 255). That is, the three areas are the planes that include White(255, 255, 255) and are parallel to the respective axes of RGB.

Accordingly, in the present embodiment, the same effect as that of the above-described first embodiment can be obtained by performing the ink color separation process in the same manner as in the above-described first embodiment. Further, printing using a wider variety of fluorescent spot colors becomes possible, so that the convenience for the user can be improved.

Other Embodiments

Although not particularly described in the above embodiments, it is also possible that the printing system 10 can selectively execute printing using a fluorescent ink and printing using only normal color inks without using the fluorescent ink. In this case, for example, on the display screen 1100, the print button 1110 for an instruction for printing is provided as two separate buttons, i.e., a fluorescent spot color printing button and a normal color printing button, so as to enable selection by the user. If the user selects the fluorescent spot color printing button, an instruction for printing using a fluorescent spot color will be provided, and, if the user selects the normal color printing button, an instruction for printing using only normal colors will be provided. Alternatively, it is also possible that whether or not a color in the fluorescent spot color palette is set for the image in the image display part 1102, so that, based on the determination, either an instruction for printing using a fluorescent spot color or an instruction for printing only with normal inks is automatically selected as an output.

Figure 20:
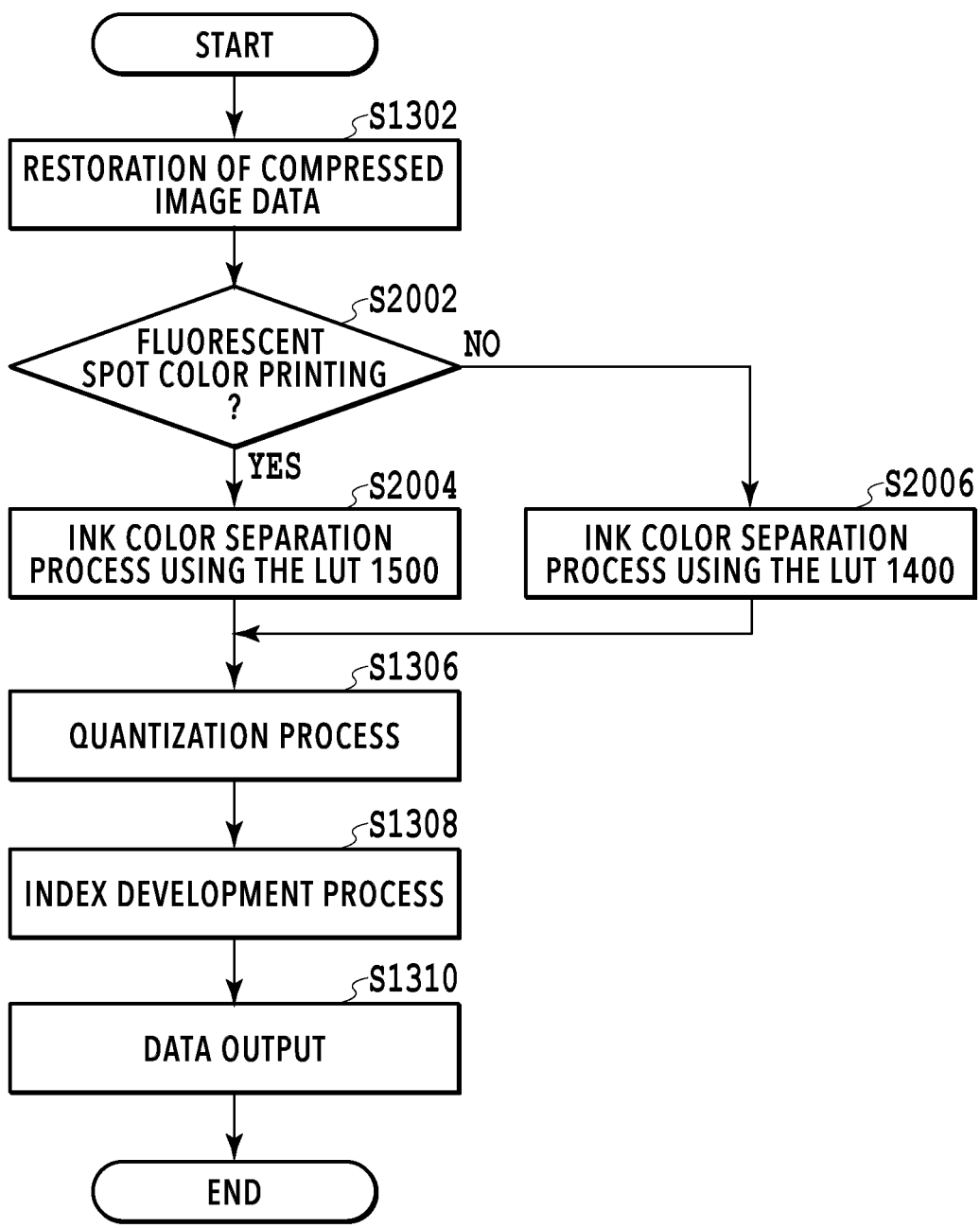
FIG. 20 is a flowchart of print data generation processing in a case where a printing system can be selected.

If an instruction for printing is received together with image data from the image processing apparatus 14, the printing apparatus 12 starts the print data generation processing. FIG. 20 is a flowchart illustrating the details of processing of the print data generation processing in the printing apparatus that is capable of selecting printing using a fluorescent ink or printing without using a fluorescent ink. Note that, as for the processes whose specific details of processing match those of the print data generation processing explained in the above-described embodiment, the explanations of the details are omitted by using the same step numbers.

If the print data generation processing is started, first, the compressed image data is restored in S1302, and then the main control part 50 determines whether or not the printing is fluorescent spot color printing, that is, printing using a fluorescent ink (S2002). In S2002, the determination is made based on the printing instruction which is output from the image processing apparatus 14 together with the image data.

If it is determined in S2002 that the fluorescent spot color printing is performed, the main control part 50 performs the ink color separation process using the LUT 1500 (S2004). On the other hand, if it is determined in S2002 that the fluorescent spot color printing is not performed, that is, printing is performed only with normal color inks, the main control part 50 performs ink color separation process using the LUT 1400 (S2006). In this way, in this embodiment, the main control part 50 functions as a selection unit that selectively executes the color separation process using the LUT 1500 or the color separation process using the LUT 1400.

If the ink color separation process is terminated, a quantization process is performed on the gradation data obtained in S1306, then an index development process is performed in S1308, then the obtained print data output in S1310 is output, and then this print data generation processing is terminated.

Further, although whether the ink color separation process using the LUT 1500 will be executed or the ink color separation process using the LUT 1400 will be executed is determined based on an instruction from the image processing apparatus 14, there is not a limitation as such. For example, it is also possible that information of whether or not a color in the fluorescent spot color palette is set in the image is output to the printing apparatus 12, so that, based on the information, which LUT is used for the ink color separation process is determined.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-018965, filed Feb. 9, 2021, which is hereby incorporated by reference herein in its entirety.

What is claimed is:

1. An information processing apparatus comprising:
a memory containing instructions; and
one or more processors for executing the instructions to convert image data into density data by use of a predetermined look-up table, in which, in RGB color coordinates, each of a plurality of grid points that are defined by dividing each axis of RGB is associated with a combination of density values respectively corresponding to a plurality of inks to be used by a printing apparatus, the image data being represented by luminance values of RGB, the density data being represented by density values respectively corresponding to the plurality of inks,
wherein, in the predetermined look-up table, the plurality of grid points include a plurality of first grid points, at which a density value of a predetermined ink among the plurality of inks does not correspond to 0, and a second grid point, at which the density value of the predetermined ink corresponds to 0, and
wherein the plurality of first grid points do not exist at points adjacent to each other in the plurality of grid points.

2. The information processing apparatus according to claim 1,
wherein the image data is data obtained by restoring compressed data which is compressed by a lossy compression system.

3. The information processing apparatus according to claim 1,
wherein the predetermined ink is a fluorescent ink using a color material having a fluorescent characteristic.

4. The information processing apparatus according to claim 3,
wherein a fluorescent pink, fluorescent red, fluorescent yellow, and fluorescent green are used as the fluorescent ink.

5. The information processing apparatus according to claim 3,
wherein a hue of the fluorescent ink is close to that of any ink other than the fluorescent ink.

6. The information processing apparatus according to claim 1,
wherein, at the first grid points, the density values of inks other than the predetermined ink are 0.

7. The information processing apparatus according to claim 1,
wherein, at the first grid points, density values of inks other than the predetermined ink and a specific ink without a fluorescent characteristic are 0.

8. The information processing apparatus according to claim 7,
wherein the specific ink is a yellow ink.

9. The information processing apparatus according to claim 8,
wherein, in the predetermined look-up table, the first grid points exist on a plane that is parallel to each axis of RGB and includes white.

10. The information processing apparatus according to claim 1,
wherein the predetermined ink is a metallic ink containing a metal particle.

11. The information processing apparatus according to claim 1,
wherein inks other than the predetermined ink include at least any one of cyan, magenta, yellow, light cyan, light magenta, gray, and black.

12. The information processing apparatus according to claim 1,
wherein the one or more processors execute the instructions to selectively execute
a first conversion for converting the image data into the density data by use of the predetermined look-up table, and
a second conversion for converting the image data into the density data by use of a look-up table in which the plurality of grid points include the second grid point only.

13. An information processing method comprising:
converting image data into density data by use of a predetermined look-up table, in which, in RGB color coordinates, each of a plurality of grid points that are defined by dividing each axis of RGB is associated with a combination of density values respectively corresponding to a plurality of inks to be used by a printing apparatus, the image data being represented by luminance values of RGB, the density data being represented by density values respectively corresponding to the plurality of inks,
wherein, in the predetermined look-up table, the plurality of grid points include a plurality of first grid points, at which a density value of a predetermined ink among the plurality of inks dose not correspond to 0, and a second grid point, at which the density value of the predetermined ink corresponds to 0, and
wherein the plurality of first grid points do not exist at points adjacent to each other in the plurality of grid points.

14. A non-transitory computer readable storage medium storing a program for causing a computer to function as an information processing apparatus, the information processing apparatus comprising:
a memory containing instructions; and
one or more processors for executing the instructions to convert image data into density data by use of a predetermined look-up table, in which, in RGB color coordinates, each of a plurality of grid points that are defined by dividing each axis of RGB is associated with a combination of density values respectively corresponding to a plurality of inks to be used by a printing apparatus, the image data being represented by luminance values of RGB, the density data being represented by density values respectively corresponding to the plurality of inks,
wherein, in the predetermined look-up table, the plurality of grid points include a plurality of first grid points, at which a density value of a predetermined ink among the plurality of inks dose not correspond to 0, and a second grid point, at which the density value of the predetermined ink corresponds to 0, and
wherein the plurality of first grid points do not exist at points adjacent to each other in the plurality of grid points.

* * * * *